US007662257B2

(12) United States Patent
Edwards et al.

(10) Patent No.: US 7,662,257 B2
(45) **Date of Patent: *Feb. 16, 2010**

(54) MULTI-PLY PAPER TOWEL WITH ABSORBENT CORE

(75) Inventors: Steven L. Edwards, Fremont, WI (US); Guy H. Super, Menasha, WI (US); Stephen J. McCullough, Mount Calvary, WI (US)

(73) Assignee: Georgia-Pacific Consumer Products LLC, Atlanta, GA (US)

( * ) Notice: Subject to any disclaimer, the term of this patent is extended or adjusted under 35 U.S.C. 154(b) by 247 days.

This patent is subject to a terminal disclaimer.

(21) Appl. No.: 11/402,609

(22) Filed: Apr. 12, 2006

(65) Prior Publication Data

US 2006/0237154 A1 Oct. 26, 2006

Related U.S. Application Data

(60) Provisional application No. 60/673,492, filed on Apr. 21, 2005.

(51) Int. Cl.

| | |
|---|---|
| ***B31F 1/12*** | (2006.01) |
| ***B31F 1/07*** | (2006.01) |
| ***D21H 27/30*** | (2006.01) |
| ***B32B 3/00*** | (2006.01) |

(52) U.S. Cl. ....................... 162/125; 162/111; 162/117; 162/123; 162/135; 162/172; 428/156; 428/172

(58) Field of Classification Search ................. 162/109, 162/111–113, 115–117, 123–133, 135, 158, 162/172; 156/183; 428/156, 212, 172; 264/282–283
See application file for complete search history.

(56) References Cited

U.S. PATENT DOCUMENTS

| | | | | |
|---|---|---|---|---|
| 2,926,116 | A | 2/1960 | Keim | 162/164 |
| 3,058,873 | A | 10/1962 | Keim et al. | 162/164 |
| 3,432,936 | A | 3/1969 | Cole et al. | 34/6 |

(Continued)

FOREIGN PATENT DOCUMENTS

| | | |
|---|---|---|
| CA | 2053505 | 4/1992 |

(Continued)

OTHER PUBLICATIONS

Chapter 2: Alkaline-Curing Polymeric Amine-Epichlorhydrin by Espy in Wet Strength Resins and Their Application (L. Chan, Editor, 1994).

(Continued)

*Primary Examiner*—José A Fortuna
(74) *Attorney, Agent, or Firm*—Michael W. Ferrell

(57) ABSTRACT

A multi-ply absorbent sheet of cellulosic fiber with continuous outer surfaces is provided an absorbent core between the outer surfaces. The absorbent core includes a non-woven fiber network having: (i) a plurality of pileated fiber enriched of relatively high local basis weight interconnected by way of (ii) a plurality of lower local basis weight linking whose fiber orientation is biased along the direction between pileated interconnected thereby, and (iii) a plurality of fiber-deprived cellules between the fiber enriched and linking regions, also being characterized by a local basis weight lower than the fiber enriched regions. The cellules provide a sponge-like internal structure of low fiber density regions.

27 Claims, 22 Drawing Sheets

U.S. PATENT DOCUMENTS

| | | | | | |
|---|---|---|---|---|---|
| 3,556,932 | A | | 1/1971 | Coscia et al. | 162/166 |
| 3,556,933 | A | | 1/1971 | Williams et al. | 162/167 |
| 3,700,623 | A | | 10/1972 | Keim | 260/80.3 R |
| 3,772,076 | A | | 11/1973 | Keim | 162/164.3 |
| 3,974,025 | A | | 8/1976 | Ayers | 162/113 |
| 3,994,771 | A | | 11/1976 | Morgan, Jr. et al. | 162/113 |
| 4,102,737 | A | | 7/1978 | Morton | 162/113 |
| 4,225,382 | A | | 9/1980 | Kearney et al. | 162/11 |
| 4,356,059 | A | | 10/1982 | Hosttler | 162/111 |
| 4,420,372 | A | | 12/1983 | Hostetler | 162/280 |
| 4,440,597 | A | | 4/1984 | Wells et al. | 162/111 |
| 4,445,638 | A | | 5/1984 | Connell et al. | 237/8 R |
| 4,448,638 | A | | 5/1984 | Klowak | 162/112 |
| 4,468,254 | A | | 8/1984 | Yokoyama et al. | 106/271 |
| 4,482,429 | A | | 11/1984 | Klowak | 162/111 |
| 4,490,925 | A | | 1/1985 | Smith | 34/42 |
| 4,528,316 | A | | 7/1985 | Soerens | 162/109 |
| 4,529,480 | A | | 7/1985 | Trokhan | 162/109 |
| 4,543,156 | A | | 9/1985 | Cheshire et al. | 162/101 |
| 4,551,199 | A | | 11/1985 | Weldon | 162/109 |
| 4,552,709 | A | | 11/1985 | Koger, II et al. | 264/504 |
| 4,556,450 | A | | 12/1985 | Chuang et al. | 162/204 |
| 4,605,702 | A | | 8/1986 | Guerro et al. | 525/154 |
| 4,614,679 | A | | 9/1986 | Farrington, Jr. et al. | 428/138 |
| 4,637,859 | A | | 1/1987 | Trokhan | 162/109 |
| 4,689,119 | A | | 8/1987 | Weldon | 162/281 |
| 4,720,383 | A | | 1/1988 | Drach et al. | 424/70 |
| 4,795,530 | A | | 1/1989 | Soerens et al. | 162/11 |
| 4,803,032 | A | | 2/1989 | Schulz | 264/284 |
| 4,834,838 | A | | 5/1989 | Klowak | 162/109 |
| 4,849,054 | A | | 7/1989 | Klowak | 162/109 |
| 4,942,077 | A | | 7/1990 | Wendt et al. | 428/152 |
| 5,087,324 | A | | 2/1992 | Awofeso et al. | 162/111 |
| 5,129,988 | A | | 7/1992 | Farrington, Jr. et al. | 162/123 |
| 5,137,600 | A | | 8/1992 | Barnes et al. | 162/115 |
| 5,215,617 | A | | 6/1993 | Grupe | 156/209 |
| 5,223,096 | A | | 6/1993 | Phan et al. | 162/158 |
| 5,262,007 | A | | 11/1993 | Phan et al. | 162/158 |
| 5,264,082 | A | | 11/1993 | Phan et al. | 162/158 |
| 5,277,761 | A | | 1/1994 | Van Phan et al. | 162/109 |
| 5,312,522 | A | | 5/1994 | Van Phan et al. | 162/111 |
| 5,314,585 | A | | 5/1994 | Ward | 162/109 |
| 5,336,373 | A | | 8/1994 | Scattolino et al. | 162/116 |
| 5,338,807 | A | | 8/1994 | Espy et al. | 525/430 |
| 5,348,620 | A | | 9/1994 | Hermans et al. | 162/9 |
| 5,366,785 | A | | 11/1994 | Sawdai | 428/156 |
| 5,411,636 | A | | 5/1995 | Hermans et al. | 162/109 |
| 5,415,737 | A | | 5/1995 | Phan et al. | 162/111 |
| 5,431,840 | A | | 7/1995 | Soldanski et al. | 510/241 |
| 5,449,026 | A | | 9/1995 | Lee | 139/383 A |
| 5,492,598 | A | | 2/1996 | Hermans et al. | 162/113 |
| 5,494,554 | A | | 2/1996 | Edwards et al. | 162/111 |
| 5,501,768 | A | | 3/1996 | Hermans et al. | 162/9 |
| 5,503,715 | A | | 4/1996 | Trokhan et al. | 162/296 |
| 5,505,818 | A | | 4/1996 | Hermans et al. | 162/113 |
| 5,508,818 | A | | 4/1996 | Hamma | 358/403 |
| 5,510,001 | A | | 4/1996 | Hermans et al. | 162/113 |
| 5,510,002 | A | | 4/1996 | Hermans et al. | 162/113 |
| 5,549,790 | A | | 8/1996 | Van Phan | 162/109 |
| 5,556,509 | A | | 9/1996 | Trokhan et al. | 162/111 |
| 5,593,545 | A | | 1/1997 | Rugowski et al. | 162/207 |
| 5,601,871 | A | | 2/1997 | Krzysik et al. | 427/288 |
| 5,607,551 | A | | 3/1997 | Farrington, Jr. et al. | 162/109 |
| 5,609,725 | A | | 3/1997 | Van Phan | 162/117 |
| 5,614,293 | A | | 3/1997 | Krzysik et al. | 428/211 |
| H1672 | H | | 8/1997 | Hermans et al. | |
| 5,656,132 | A | | 8/1997 | Farrington, Jr. et al. | 162/117 |
| 5,667,636 | A | | 9/1997 | Engel et al. | 162/117 |
| 5,672,248 | A | | 9/1997 | Wendt et al. | 162/109 |
| 5,674,590 | A | | 10/1997 | Anderson et al. | 428/154 |
| 5,690,149 | A | | 11/1997 | Lee | 139/383 A |
| 5,695,607 | A | | 12/1997 | Oriaran et al. | 162/112 |
| 5,725,734 | A | * | 3/1998 | Herman et al. | 162/111 |
| 5,746,887 | A | | 5/1998 | Wendt et al. | 162/109 |
| 5,772,845 | A | | 6/1998 | Farrington, Jr. et al. | 162/109 |
| 5,814,190 | A | | 9/1998 | Van Phan | 162/111 |
| 5,830,321 | A | * | 11/1998 | Lindsay et al. | 162/204 |
| 5,840,403 | A | | 11/1998 | Trokhan et al. | 428/154 |
| 5,851,353 | A | | 12/1998 | Fiscus et al. | 162/113 |
| 5,888,347 | A | | 3/1999 | Engel et al. | 162/117 |
| 5,932,068 | A | | 8/1999 | Farrington, Jr. et al. | 162/117 |
| 5,935,381 | A | | 8/1999 | Trokhan et al. | 162/109 |
| 5,961,782 | A | | 10/1999 | Luu et al. | 162/111 |
| 6,017,417 | A | | 1/2000 | Wendt et al. | 162/109 |
| 6,033,736 | A | | 3/2000 | Perlman et al. | 427/384 |
| 6,080,279 | A | | 6/2000 | Hada et al. | 162/290 |
| 6,083,346 | A | | 7/2000 | Hermans et al. | 162/115 |
| 6,093,284 | A | | 7/2000 | Hada et al. | 162/290 |
| 6,096,169 | A | | 8/2000 | Hermans et al. | 162/115 |
| 6,117,525 | A | | 9/2000 | Trokhan et al. | 428/154 |
| 6,133,405 | A | | 10/2000 | Allen | 528/310 |
| 6,136,146 | A | | 10/2000 | Van Phan et al. | 162/109 |
| 6,139,686 | A | | 10/2000 | Trokhan et al. | 162/109 |
| 6,143,135 | A | | 11/2000 | Hada et al. | 162/290 |
| 6,146,499 | A | * | 11/2000 | Lin et al. | 162/197 |
| 6,149,767 | A | | 11/2000 | Hermans et al. | 162/111 |
| 6,149,769 | A | | 11/2000 | Mohammadi et al. | 162/111 |
| 6,161,303 | A | | 12/2000 | Beck | 34/199 |
| 6,162,327 | A | | 12/2000 | Batra et al. | 162/109 |
| 6,171,442 | B1 | | 1/2001 | Farrington, Jr. et al. | 162/129 |
| 6,187,137 | B1 | | 2/2001 | Druecke et al. | 162/109 |
| 6,190,506 | B1 | | 2/2001 | Beck | 162/357 |
| 6,197,154 | B1 | | 3/2001 | Chen et al. | 162/109 |
| 6,207,011 | B1 | | 3/2001 | Luu et al. | 162/111 |
| 6,210,528 | B1 | | 4/2001 | Wolkowicz | 162/111 |
| 6,228,220 | B1 | | 5/2001 | Hada et al. | 162/203 |
| 6,248,203 | B1 | | 6/2001 | Beck | 156/286 |
| 6,261,679 | B1 | * | 7/2001 | Chen et al. | 428/317.9 |
| 6,274,042 | B1 | | 8/2001 | Beck | 210/500.27 |
| 6,280,573 | B1 | | 8/2001 | Lindsay et al. | 162/198 |
| 6,287,426 | B1 | | 9/2001 | Edwards et al. | |
| 6,287,427 | B1 | | 9/2001 | Beck | 162/360.3 |
| 6,306,257 | B1 | | 10/2001 | Hada et al. | 162/290 |
| 6,306,258 | B1 | | 10/2001 | Lange et al. | 162/290 |
| 6,318,727 | B1 | | 11/2001 | Hada | 277/345 |
| 6,331,230 | B1 | | 12/2001 | Hermans et al. | 162/207 |
| 6,350,349 | B1 | | 2/2002 | Hermans et al. | 162/111 |
| 6,379,496 | B2 | | 4/2002 | Edwards et al. | 162/111 |
| 6,381,868 | B1 | | 5/2002 | Grabscheid et al. | 34/114 |
| 6,416,631 | B1 | | 7/2002 | Beck | 162/360.3 |
| 6,419,793 | B1 | | 7/2002 | Beck | 428/154 |
| 6,420,013 | B1 | | 7/2002 | Vinson et al. | 428/154 |
| 6,432,267 | B1 | | 8/2002 | Watson | 162/111 |
| 6,432,270 | B1 | * | 8/2002 | Liu et al. | 162/164.4 |
| 6,436,234 | B1 | | 8/2002 | Chen et al. | 162/109 |
| 6,447,640 | B1 | | 9/2002 | Watson et al. | 162/101 |
| 6,447,641 | B1 | | 9/2002 | Wolkowicz et al. | 162/109 |
| 6,454,904 | B1 | | 9/2002 | Hermans et al. | 162/205 |
| 6,461,474 | B1 | | 10/2002 | Lindsay et al. | 162/109 |
| 6,464,829 | B1 | | 10/2002 | Chen et al. | 162/109 |
| 6,478,927 | B1 | | 11/2002 | Chen et al. | 162/109 |
| 6,497,789 | B1 | | 12/2002 | Hermans et al. | 162/205 |
| 6,534,151 | B2 | | 3/2003 | Merker | 428/154 |
| 6,547,924 | B2 | | 4/2003 | Klerelid et al. | 162/109 |
| 6,551,461 | B2 | | 4/2003 | Hermans et al. | 162/207 |
| 6,562,198 | B2 | | 5/2003 | Beck et al. | 162/360.3 |
| 6,565,707 | B2 | | 5/2003 | Behnke et al. | 162/112 |
| 6,579,418 | B2 | | 6/2003 | Lindsay et al. | 162/198 |
| 6,585,855 | B2 | | 7/2003 | Drew et al. | 162/109 |
| 6,589,394 | B2 | | 7/2003 | Beck | 162/360.3 |
| 6,607,638 | B2 | | 8/2003 | Drew et al. | 162/204 |
| 6,610,173 | B1 | | 8/2003 | Lindsay et al. | 162/109 |
| 6,616,812 | B2 | | 9/2003 | Beck | 162/358.2 |
| 6,645,420 | B1 | | 11/2003 | Beck | 264/504 |

| | | | | |
|---|---|---|---|---|
| 6,701,637 | B2 * | 3/2004 | Lindsay et al. | 34/71 |
| 6,746,558 | B2 | 6/2004 | Hoeft et al. | 156/209 |
| 6,752,907 | B2 * | 6/2004 | Edwards et al. | 162/207 |
| 6,797,115 | B2 * | 9/2004 | Klerelid et al. | 162/111 |
| 2001/0008180 | A1 | 7/2001 | Anderson et al. | 162/111 |
| 2002/0062936 | A1 | 5/2002 | Klerelid et al. | 162/16 |
| 2002/0088577 | A1 | 7/2002 | Watson et al. | 162/109 |
| 2002/0134520 | A1 | 9/2002 | Behnke et al. | 162/100 |
| 2002/0148584 | A1 * | 10/2002 | Edwards et al. | 162/204 |
| 2003/0000664 | A1 | 1/2003 | Drew et al. | 162/109 |
| 2003/0021952 | A1 | 1/2003 | Zink et al. | 428/137 |
| 2003/0056919 | A1 | 3/2003 | Beck | 162/199 |
| 2003/0056921 | A1 | 3/2003 | Beck et al. | 162/290 |
| 2003/0056922 | A1 | 3/2003 | Beck | 162/290 |
| 2003/0056923 | A1 | 3/2003 | Beck | 162/290 |
| 2003/0056925 | A1 | 3/2003 | Beck | 162/358.1 |
| 2003/0098134 | A1 | 5/2003 | Scherb et al. | 162/117 |
| 2003/0102098 | A1 | 6/2003 | Allen et al. | 162/203 |
| 2003/0111195 | A1 | 6/2003 | Hu | 162/111 |
| 2003/0121626 | A1 | 7/2003 | Hultzcrantz | 162/111 |
| 2003/0146581 | A1 | 8/2003 | Beck | 277/159 |
| 2003/0153443 | A1 | 8/2003 | Beck | 492/159 |
| 2004/0089168 | A1 | 5/2004 | Beck | 100/159 |
| 2004/0226673 | A1 | 11/2004 | Edwards et al. | 162/109 |
| 2004/0238135 | A1 * | 12/2004 | Edwards et al. | 162/111 |
| 2005/0217814 | A1 * | 10/2005 | Super et al. | 162/111 |
| 2005/0241786 | A1 * | 11/2005 | Edwards et al. | 162/109 |
| 2005/0241787 | A1 * | 11/2005 | Murray et al. | 162/113 |
| 2005/0279471 | A1 * | 12/2005 | Murray et al. | 162/111 |
| 2006/0237154 | A1 * | 10/2006 | Edwards et al. | 162/111 |
| 2006/0289134 | A1 * | 12/2006 | Yeh et al. | 162/111 |
| 2007/0107863 | A1 * | 5/2007 | Edwards et al. | 162/111 |
| 2007/0137807 | A1 * | 6/2007 | Schulz et al. | 162/109 |
| 2008/0008860 | A1 * | 1/2008 | Murray et al. | 428/152 |
| 2008/0029235 | A1 * | 2/2008 | Edwards et al. | 162/111 |
| 2008/0047675 | A1 * | 2/2008 | Murray et al. | 162/101 |

FOREIGN PATENT DOCUMENTS

| | | | | |
|---|---|---|---|---|
| EP | 0 098 683 | | * | 1/1984 |
| WO | WO 00/14330 | A1 | | 3/2000 |
| WO | WO 01/85109 | A1 | | 11/2001 |
| WO | WO 2004033793 | A2 | * | 4/2004 |
| WO | WO 2005103375 | A1 | * | 11/2005 |
| WO | WO 2006115817 | A2 | * | 11/2006 |

OTHER PUBLICATIONS

Trivedi et al., J. Am. Oil Chemist's Soc., Jun. 1981, pp. 754-756.
Westfelt in Cellulose Chemistry and Technology, vol. 13, p. 813, 1979.
Egan, J.Am. Oil Chemist's Soc., vol. 55 (1978), pp. 118-121.
Evans, Chemistry and Industry, Jul. 5, 1969, pp. 893-903.
U.S. Appl. No. 11/867,113, filed Oct. 4, 2007, Kokko et al.
U.S. Appl. No. 11/804,246, filed May 16, 2007, Edwards et al.
U.S. Appl. No. 11/678,669, filed Feb. 26, 2007, Chou et al.
U.S. Appl. No. 60/903,789, filed Feb. 27, 2007, Chou et al.
U.S. Appl. No. 60/881,310, filed Jan. 19, 2007, Sumnicht.

* cited by examiner

MULTI-PLY PAPER TOWEL WITH ABSORBENT CORE

CLAIM FOR PRIORITY

This non-provisional application is based upon U.S. Provisional Patent Application Ser. No. 60/673,492, of the same title, filed Apr. 21, 2005. The priority of U.S. Provisional Patent Application Ser. No. 60/673,492 is hereby claimed and the disclosure thereof is incorporated into this application by reference.

TECHNICAL FIELD

The Present invention relates generally to absorbent products made from cellulosic fiber. More specifically, the invention is directed to multi-ply absorbent towel, tissue and the like provided with an absorbent core having local basis weight variations including fiber-deprived referred to herein as cellules. The inventive products exhibit a sponge-like response to sorbed liquid.

BACKGROUND

Methods of making paper tissue, towel, and the like are well known, including various features such as Yankee drying, throughdrying, fabric creping, dry creping, wet creping and so forth. Conventional wet pressing processes (CWP) have certain advantages over conventional through-air drying processes (TAD) including: (1) lower energy costs associated with the mechanical removal of water rather than transpiration drying with hot air; and (2) higher production speeds which are more readily achieved with processes which utilize wet pressing to form a web. On the other hand, through-air drying processes have become the method of choice for new capital investment, particularly for the production of soft, bulky, premium quality tissue and towel products.

Fabric creping has been employed in connection with papermaking processes which include mechanical or compactive dewatering of the paper web as a means to influence product properties. See U.S. Pat. Nos. 4,689,119 and 4,551,199 of Weldon; U.S. Pat. Nos. 4,849,054 and 4,834,838 of Klowak; and U.S. Pat. No. 6,287,426 of Edwards et al. Operation of fabric creping processes has been hampered by the difficulty of effectively transferring a web of high or intermediate consistency to a dryer. Note also U.S. Pat. No. 6,350,349 to Hermans et al. which discloses wet transfer of a web from a rotating transfer surface to a fabric. Further patents relating to fabric creping with a fixed gap transfer or rush transferring as the operation is known in the art include the following United States Patents: U.S. Pat. Nos. 4,834,838; 4,482,429; 4,445,638, as well as U.S. Pat. No. 4,440,597 to Wells et al.

In connection with papermaking processes, fabric molding has also been employed as a means to provide texture and bulk. In this respect, there is seen in U.S. Pat. No. 6,610,173 to Lindsay et al. a method for imprinting a paper web during a wet pressing event which results in asymmetrical protrusions corresponding to the deflection conduits of a deflection member. The '173 patent reports that a differential velocity transfer during a pressing event serves to improve the molding and imprinting of a web with a deflection member. The tissue webs produced are reported as having particular sets of physical and geometrical properties, such as a pattern densified network and a repeating pattern of protrusions having asymmetrical structures. With respect to wet-molding of a web using textured fabrics, see, also, the following U.S. Pat. Nos. 6,017,417 and 5,672,248 both to Wendt et al; U.S. Pat. Nos. 5,505,518 and 5,510,002 to Hermans et al. and U.S. Pat. No. 4,637,859 to Trokhan. With respect to the use of fabrics used to impart texture to a mostly dry sheet, see U.S. Pat. No. 6,585,855 to Drew et al., as well as United States Publication No. US 2003/0000664.

Structures with local variations in basis weight are also known in the paper making art. These structures are reported to conserve fiber and provide areas of elevated absorbency. There is disclosed, for example in U.S. Pat. No. 6,136,146 to Phan et al. entitled "Non-through Air Dried Paper Web Having Different Basis Weights and Densities" a paper web including at least two regions of different densities and two of different basis weight. The paper web includes a relatively high basis weight continuous network region and a plurality of discreet, relatively low basis weight dispersed throughout the relatively high basis weight continuous network and a plurality of discreet, intermediate basis weight circumscribed by the relatively low basis weight regions.

U.S. Pat. No. 5,503,715 to Trokhan et al. entitled "Method and Apparatus for making Cellulosic Fibrous Structures By Selectively Obturated Drainage and Cellulosic Fibrous Structures Produced Thereby" also discloses a cellulosic web having different basis weight regions. This structure is a paper having an essentially continuous high basis weight network and discreet regions of low basis weight formed by using a forming belt having zones with different flow resistances. The basis weight of a region of the paper is generally inversely proportional to the flow resistance at the zone of the forming belt upon which the web is formed.

U.S. Pat. No. 4,942,077 to Wendt et al. entitled "Tissue Webs Having Irregular Pattern of Densified Areas" discloses creped tissue webs having at least a machine direction broken line pattern of individual densified areas containing higher mass concentrations of fiber.

Two and three-ply absorbent products are described in the following: U.S. Pat. No. 6,746,558 to Hoeft et al. entitled "Absorbent Paper Product of at Least Three Plies and Method of Manufacture", U.S. Pat. No. 5,215,617 to Grupe entitled "Method for Making Plied Towels", and U.S. Pat. No. 4,803,032 to Shultz entitled "Method of Spot Embossing a Fibrous Sheet."

It is known that the embossing/ply-attachment process in towel production provides voids between the two attached plies which hold water that is absorbed through the sheet. With respect to sheets made by CWP processes, these voids are produced by attaching two sheets that were dried in the flat state and then dry-creped. Wetting these types of towels causes them to expand and then collapse back to their as-dried states. Therefore, truly high performance towels are made using the TAD process where the sheet is dried in the (fabric) molded state. When wetted, TAD towels can actually expand, increasing their water holding capacity and the visual perception of higher performance-like that of a dry sponge.

There is provided in accordance with the present invention absorbent products which exhibit sponge-like response to sorbed liquid without the need for throughdrying.

SUMMARY OF INVENTION

The present invention utilizes to advantage a fabric-creped web wherein the web may be wet-pressed and then the fiber is redistributed on a creping belt or fabric so that it has local variations in basis weight which persist when the web is wetted. The unique structure is disposed in the interior of a multi-ply product to produce truly high performance absorbency.

In accordance with the present invention there is thus provided a multi-ply absorbent sheet of cellulosic fiber provided with continuous outer surfaces and an absorbent core between the outer surfaces, the absorbent core including a non-woven fiber network comprising: (i) a plurality of pileated fiber enriched regions of relatively high local basis weight interconnected by way of (ii) a plurality of lower local basis weight linking whose fiber orientation is biased along the direction between pileated interconnected thereby, and (iii) a plurality of fiber-deprived cellules between the fiber enriched and linking regions, also being characterized by a local basis weight lower than the fiber enriched regions. The sheet may be a two-ply sheet or a three-ply sheet. In some cases, the non-woven network of the core is an open mesh structure defining a plurality of cellules having devoid of fiber wherein, for example, the voids in the cellules have an average span of from about 10 to about 2500 microns or wherein the empty cellules or voids have an average span of from about 50 to about 500 microns. The cellules need not be devoid of fiber, in which case the span of the cellule is the border defined by the pileated and linking regions, which may have a span of from about 50 to about 2500 microns, preferably from about 100 to about 500 microns. In such cases, the fiber-deprived cellules comprise a plurality of integument of fiber connecting pileated to adjacent pileated and linking to adjacent linking regions.

Still other attributes which may characterize the multi-ply product in various embodiments are: a bulk of at least about 6 cc/g; a bulk of at least about 7.5 cc/g; a bulk of at least about 10 cc/g; a bulk of at least about 15 cc/g; an absorbency of at least 5 g/g; an absorbency of at least about 7 g/g; an absorbency of at least about 9 g/g; an absorbency of at least about 11 g/g; an absorbency of at least about 13 g/g; a void volume fraction of from about 0.7 to about 0.9; a void volume fraction of from about 0.75 to about 0.85; a Wet Springback Ratio of at least about 0.6; a Wet Springback Ratio of at least about 0.65; and/or a Wet Springback Ratio of from about 0.6 to about 0.8.

In another aspect of the invention, there is provided a three-ply absorbent sheet comprising:

a) a first outer ply of cellulosic sheet having a substantially continuous surface;
b) a second outer ply of cellulosic sheet having a substantially continuous surface; and
c) an absorbent core ply sandwiched between the outer plies consisting essentially of a non-woven fiber network of cellulosic fiber comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions.

Using the process described in U.S. patent application Ser. No. 10/679,862, now U.S. Pat. No. 7,399,378, entitled "Fabric Crepe Process for Making Absorbent Sheet", two plies of high performance towel basesheet can be plied together using conventional converting technology to produce a product that exhibits TAD-like performance. However, while these towels can compete at the consumer level, at the technical level, TAD towels exhibit higher water holding capacity at a given basis weight and tensile. One way to overcome this deficit is to go to a 3-ply structure. Rather than combining three plies of identical substructure, one of the plies is made at an entirely different set of creping parameters. For example, the center ply of the towel could be made of a non continuous structure like those shown herein. By choosing the correct basis weight and fabric creping ratio, the desired degree of pore structure can be made for the center ply to exhibit significantly improved water holding capacity. Since this center ply can be made at a reduced basis weight as compared with the outer plies, the overall weight of the towel will be significantly less than a conventional 3-ply towel. Further, since this center ply is even more flexible than the outer plies which are already very flexible, the final towel product exhibits surprisingly little stiffness but yet exhibits surprisingly high wet resilience. (Wet resilience can be defined as the ability of a crumpled, wetted, towel to be opened again as, for example, when the excess moisture has been wrung out of it.)

A two-ply embodiment comprises:

a) a first ply having a substantially continuous first surface and a second surface with local variations in basis weight comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions;
b) a second ply having a substantially continuous third surface and a fourth surface with local variation in basis weight comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions, wherein the plies are secured to each other such that the second surface of the first ply is in contact with the fourth surface of the second ply to form the core of the sheet and the first surface of the first ply and the third surface of the second ply are outer surfaces of the sheet.

A towel of this invention can be further treated to make personal care product like a diaper or feminine panty liner or like protection device. This is accomplished by treating the outer plies with a barrier material as described in co-pending U.S. patent application Ser. No. 10/702,414, entitled "Absorbent Sheet Exhibiting Resistance to Moisture Penetration", the disclosure of which is incorporated herein in its entirety by reference. Since this barrier remains porous while exhibiting barrier properties, this property can be utilized to provide a liner surface that feels dry even when the layers below are saturated. While the surface of the liner would repel aqueous materials, the fibers immediately below the treated surface remain quite hydrophilic thereby causing any aqueous liquids coming in contact with the surface to be wicked through to the internal voids of the device. However, the reverse movement of the liquid is prevented by the fact that no such wicking materials exist on the "skin" side of the device. Therefore, even though the device is filled with liquid, the surface in contact with the skin remains dry and therefore to the touch feels dry and comfortable. Similarly, the other side of the device could also be treated in a similar manner. Since the porosity of the device is relatively unaffected by the barrier treatment process, the device will "breathe" in use adding significantly to the overall comfort to the wearer. One further manufacturing advantage of this device is that all of the fiber present are recyclable in normal papermaking processes.

Thus, in one preferred embodiment, at least one of the outer surfaces of the sheet is provided with a fused wax composition in intimate contact with the fibers in the web, the fused wax composition including a wax and an emulsifier fused in situ with the sheet and being disposed in the sheet so that the open interstitial microstructure between fibers in the web is substantially preserved and the sheet has a laterally hydrophobic outer surface which exhibits a moisture penetration delay of at least about 2 seconds as well as a contact angle with water of at least 50 degrees at one minute of contact time with the surface. Generally, the laterally hydrophobic outer surface of the sheet exhibits a moisture penetration delay of from about 3 to about 40 seconds. Preferably, the hydrophobic outer surface of the sheet exhibits a moisture penetration delay of at least about 5 seconds and in some cases a moisture penetration delay of at least about 10 seconds.

While providing many advantages as noted above, the 3-ply structure does add considerably to the costs of the final product. Is has been discovered that products exhibiting similar structures can be made in a modified Fabric Crepe process. Rather than providing a separate center layer exhibiting the low stiffness and high void volumes, it is possible to introduce two separate structures into each one of the two plies that would be used to make a two-ply towel. By carefully selecting the design of the creping fabric so that there are relatively long gaps between CD knuckles that are not too deep, the net-like structures seen in the accompanying photos can be produced on the fabric side of the sheet providing that sufficient fabric creping speed differential is used. When the proper conditions are chosen (fabric design, basis weight, creping differential) the fabric side of the sheet will tend to be "sheared" away from the backing roll side so that the net-like structure can be produced. Further into the fabric creping step, the backing roll side of the sheet is also creped but to a much lesser degree. Since the fabric design is chosen so that once the net-like structure is produced most of the void volume of the fabric has been filled, the backing roll side of the sheet will "cover the voids" produced on the fabric side. Subsequent converting will then place the two fabric sides together to maximize the voids present in the final product. Since all of these structures were dried into the basesheet, the final product will act very much like a TAD product, but with much lower stiffness and better wipe-dry characteristics due to the relatively low porosity of the outer surface of the sheet. Like the process taught in co-pending U.S. patent application Ser. No. 10/679,862, entitled "Fabric Crepe Process for Making Absorbent Sheet", variations in the degree to which the process variables are adjusted will produce a wide range of performance characteristics with relative low sensitivity to fiber types used.

The effectiveness of this invention can further be improved by other process modifications. For example, to improve the degree to which the sheet is "sheared" in the creping step, larger diameter rolls with harder covers can be used. These conditions provide for a much shallower approach angle between the creping fabric and the sheet on the backing roll. Smaller angles provide for more slip before the sheet is locked into the fabric. Another modification is to employ the processing characteristics taught in U.S. Pat. No. 6,379,496. This patent teaches control of the temperature of the backing roll surface so that the sheet is partially dry on the roll side, which increases the adhesion of the sheet to the roll thereby delaying the point at which the sheet is locked into the creping fabric. This delay allows for the use of fabrics with even larger gaps between the CD knuckles or to produce sheets at lower basis weights. Concurrent with the roll side being drier, U.S. Pat. No. 6,379,496 teaches that the fabric side of the sheet would be considerably wetter than the composite average. This higher moisture in the outer part of the sheet makes it easier to shear the sheet and to mold it into the creping fabric thereby further improving the overall efficiency of the process and performance of the finished product.

Thus, a method of preparing a sided cellulosic sheet having local basis weight variation on one side thereof is practiced by way of:

a) dewatering a papermaking furnish to form a nascent web having an apparently random distribution of papermaking fiber;
b) applying the dewatered web having the apparently random fiber distribution to a transfer surface of a rotating heated cylinder moving at a first speed;
c) controlling temperature of the heated rotating cylinder to provide a moisture profile within the web;
d) belt-creping the web from the transfer surface at a consistency of from about 30 to about 60 percent utilizing a patterned creping belt, the creping step occurring under pressure in a belt creping nip defined between the transfer surface and the creping belt wherein the belt is traveling at a second speed slower than the speed of said transfer surface, the belt pattern, nip parameters, velocity delta, moisture profile and web consistency being selected such that the web is creped from the transfer surface and the fiber distal to the cylinder surface is redistributed on the creping belt, while the fiber adjacent the heated rotating cylinder retains its apparently random fiber distribution; and
e) drying the web to form the sheet, wherein the side of the sheet distal to the heated rotating cylinder and contacting the creping belt is provided a network structure of local basis weight variation comprising: (i) a plurality of pileated fiber enriched regions of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions.

As part of the process, the web may be dried with a plurality of can dryers while it is held in the creping fabric and/or with an impingement air dryer. Fabric Crepe may be from 10 to 100 percent. In some cases, at least about 40, 60 or 80 percent Fabric Crepe is desired. The cylinder may be heated with steam at a pressure of anywhere from 50 to 150 psig, while the web is typically dried on the cylinder to a consistency of 40-50 percent solids. The dewatered web is optionally applied to the heated rotating cylinder with a creping adhesive including polyvinyl alcohol, for example.

Another method of preparing a multi-ply absorbent sheet in accordance with the invention includes:

a) preparing first and second plies by way of:
   (i) dewatering a papermaking furnish to form a nascent web having an apparently random distribution of papermaking fiber;
   (ii) applying the dewatered web having the apparently random fiber distribution to a transfer surface of a rotating heated cylinder moving at a first speed;
   (iii) controlling temperature of the heated rotating cylinder to provide a moisture profile within the web;
   (iv) belt-creping the web from the transfer surface at a consistency of from about 30 to about 60 percent utilizing a patterned creping belt, the creping step occurring under pressure in a belt creping nip defined between the transfer surface and the creping belt wherein the belt is traveling at a second speed slower than the speed of said transfer surface, the belt pattern, nip parameters, velocity delta, moisture profile and web consistency being selected such that the web is creped from the transfer surface and the fiber distal to the cylinder surface is redistributed on the creping belt, while the fiber adjacent the heated rotating cylinder retains its apparently random fiber distribution; and (v) drying the web to form the sheet, wherein the side of the sheet distal to the heated rotating cylinder and contacting the creping belt is provided a network structure of local basis weight variation comprising: (i) a plurality of pileated fiber enriched regions of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions; and b) plying the first and second plies together such that their sides with the network structure of local basis weight variation are in contact with each other so that the absorbent sheet has a core with fiber-deprived cellules.

Still yet another method of preparing a multi-ply absorbent sheet of the invention includes:

a) preparing a cellulosic sheet having local variation in basis weight by way of:

(i) dewatering a papermaking furnish to form a nascent web having an apparently random distribution of papermaking fiber;

(ii) applying the dewatered web having the apparently random fiber distribution to a translating transfer surface moving at a first speed;

(iii) belt-creping the web from the transfer surface at a consistency of from about 30 to about 60 percent utilizing a patterned creping belt, the creping step occurring under pressure in a belt creping nip defined between the transfer surface and the creping belt wherein the belt is traveling at a second speed slower than the speed of said transfer surface, the belt pattern, nip parameters, velocity delta and web consistency being selected such that the web is creped from the transfer surface and redistributed on the creping belt, and (iv) drying the web to form the sheet;

wherein the sheet has a non-woven fiber network comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions, and c) plying the cellulosic sheet having local variation in basis weight with at least a second cellulosic sheet such that the fiber-deprived cellules are in the core of the multi-ply sheet.

In some embodiments, it is advantageous to practice the inventive process such that the sheet having a local variation in basis weight is characterized by a Fabric Crepe Index (hereinafter defined) of from about 0.5 to about 3. Typically, the Fabric Crepe Index is at least about 0.75; a Fabric Crepe Index of at least about 1 is usually preferred. Fabric Crepe Indices of at least about 1.5 or 2 are preferred when fiber-deprived having very low local basis weight regions are sought.

BRIEF DESCRIPTION OF DRAWINGS

The invention is described in detail below with reference to the drawings wherein like numerals designate similar parts and wherein.

DETAILED DESCRIPTION

Figure 1:
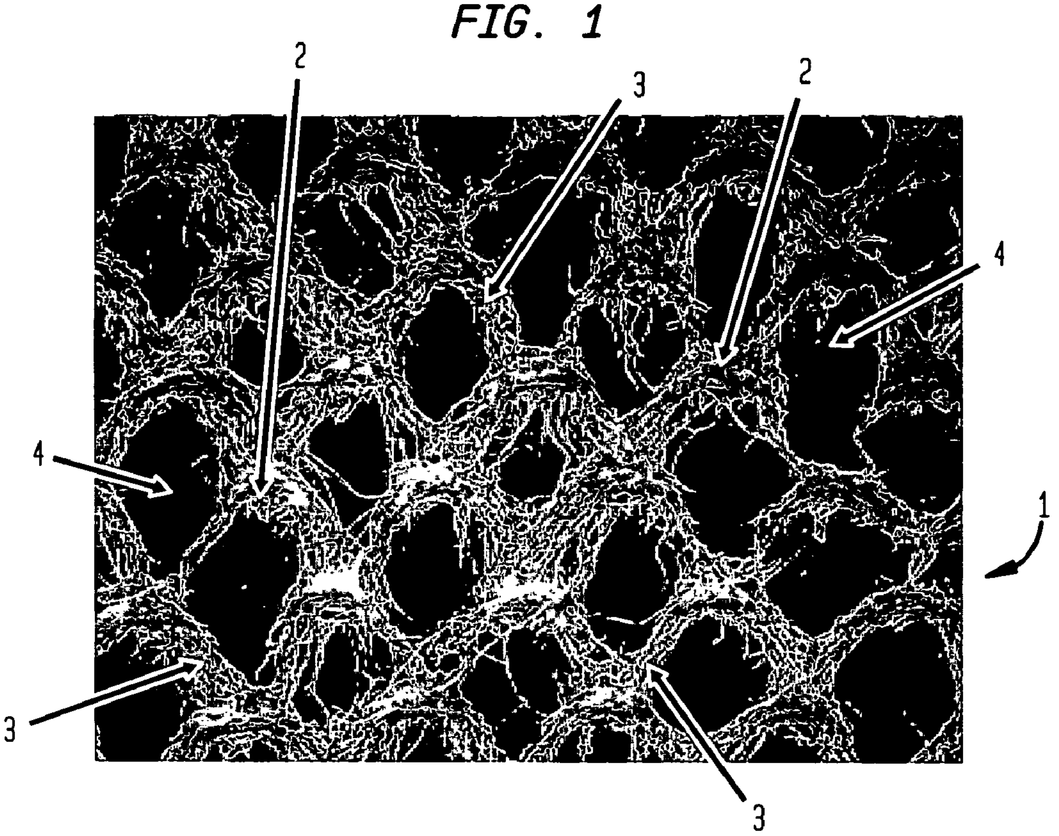
FIG. 1 is a photomicrograph (8×) of an open mesh web including a plurality of high basis weight linked by lower basis weight regions extending therebetween.

The invention is described below with reference to several embodiments. Such discussion is for purposes of illustration only. Modifications to particular examples within the spirit and scope of the present invention, set forth in the appended claims, will be readily apparent to one of skill in the art.

Terminology used herein is given its ordinary meaning and the definitions set forth immediately below, unless the context indicates otherwise.

The term "cellulosic", "cellulosic sheet" and the like is meant to include any product incorporating papermaking fiber having cellulose as a major constituent. "Papermaking fibers" include virgin pulps or recycle cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood kraft fibers; hardwood fibers, such as eucalyptus, maple, birch, aspen, or the like. Papermaking fibers can be liberated from their source material by any one of a number of chemical pulping processes familiar to one experienced in the art including sulfate, sulfite, polysulfide, soda pulping, etc. The pulp can be bleached if desired by chemical means including the use of chlorine, chlorine dioxide, oxygen and so forth. The products of the present invention may comprise a blend of conventional fibers (whether derived from virgin pulp or recycle sources) and high coarseness lignin-rich tubular fibers, such as bleached chemical thermomechanical pulp (BCTMP). "Furnishes" and like terminology refers to aqueous compositions including papermaking fibers, wet strength resins, debonders and the like for making paper products.

As used herein, the term wet pressing the web or furnish refers to mechanical dewatering by wet pressing on a dewatering felt, for example by use of mechanical pressure applied continuously over the web surface as in a nip. Wet pressing a nascent a web thus refers, for example, to removing water from a nascent web having a consistency of less than 30 percent or so by application of pressure thereto and/or increasing the consistency of the web by about 15 percent or more by application of pressure thereto while the wet web is in contact with a felt. The terminology "without wet pressing", "non-compactively dewatering" and other like terminology means that the web is not compressed over its entire surface for purposes of pressing water out of the wet web. As opposed to wet pressing, the web is initially typically dewatered by can-drying in a dryer fabric. Localized compression or shaping by fabric knuckles does not substantially dewater the web and accordingly is not considered wet-pressing the web to remove water. The drying of the nascent web is thus thermal drying rather than compactive in nature.

Unless otherwise specified, "basis weight", BWT, bwt and so forth refers to the weight of a 3000 square foot ream of product. Consistency refers to percent solids of a nascent web, for example, calculated on a bone dry basis. "Air Dry" means including residual moisture, by convention about 10 percent moisture for pulp and about 6% for paper. A nascent web having 50 percent water and 50 percent bone dry pulp has a consistency of 50 percent.

Calipers and/or bulk reported herein are 8 sheet calipers unless otherwise indicated. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec descent rate. For finished product testing, each sheet of product to be tested must have the same number of plies as the product is sold. Select and stack eight sheets together. For napkin testing, completely unfold napkins prior to stacking. For basesheet testing off of winders, each sheet to be tested must have the same number of plies as produced off the winder. Select and stack eight sheets together. For basesheet testing off of the papermachine reel, single plies must be used. Select and stack eight sheets together aligned in the MD. On custom embossed or printed product, try to avoid taking measurements in these areas if at all possible. Bulk may also be derived from density, expressed in units of volume/weight by dividing caliper by basis weight.

Absorbency of the inventive products is measured with a simple absorbency tester. The simple absorbency tester is a particularly useful apparatus for measuring the hydrophilicity and absorbency properties of a sample of tissue, napkins, or towel. In this test a sample of tissue, napkins, or towel 2.0 inches in diameter is mounted between a top flat plastic cover and a bottom grooved sample plate. The tissue, napkin, or towel sample disc is held in place by a ⅛ inch wide circumference flange area. The sample is not compressed by the holder. De-ionized water at 73° F. is introduced to the sample at the center of the bottom sample plate through a 1 mm. diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per square meter of sample or grams of water per gram of sheet. In practice, an M/K Systems Inc. Gravimetric Absorbency Testing System is used. This is a commercial system obtainable from M/K Systems Inc., 12 Garden Street, Danvers, Mass., 01923. WAC or water absorbent capacity also referred to as SAT is actually determined by the instrument itself. WAC is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a 5 second time interval as termination criteria; unless "Slow SAT" is specified in which case the cut off criteria is 1 mg in 20 seconds.

Dry tensile strengths (MD and CD), stretch, ratios thereof, break modulus, stress and strain are measured with a standard Instron test device or other suitable elongation tensile tester which may be configured in various ways, typically using 3 or 1 inch wide strips of tissue or towel, conditioned at 50% relative humidity and 23° C. (73.4), with the tensile test run at a crosshead speed of 2 in/min.

MD means machine direction and CD means cross-machine direction.

Tensile ratios are simply ratios of the values determined by way of the foregoing methods. Unless otherwise specified, a tensile property is a dry sheet property.

Throughout this specification and claims, when we refer to a nascent web having an apparently random distribution of fiber orientation (or use like terminology), we are referring to the distribution of fiber orientation that results when known forming techniques are used for depositing a furnish on the forming fabric. When examined microscopically, the fibers give the appearance of being randomly oriented even though, depending on the jet to wire speed, there may be a significant bias toward machine-direction orientation making the machine-direction tensile strength of the web exceed the cross-direction tensile strength.

Fpm refers to feet per minute.

Fabric Crepe Ratio is an expression of the speed differential between a creping belt or fabric and the transfer cylinder or surface and is defined as the ratio of the web speed immediately before creping and the web speed immediately following creping, for example:

Fabric Crepe Ratio=Transfer cylinder speed÷Creping fabric speed

Fabric Crepe can also be expressed as a percentage calculated as:

Fabric Crepe, percent,=(Fabric Crepe Ratio−1)×100%

PLI or pli means pounds force per linear inch.

Fabric Crepe Index is used to characterize the process by which a sheet having local variation in basis weight is prepared. The Index is also a structural parameter of the sheet because a higher Fabric Crepe Index results in more local basis weight variation. Fabric Crepe Index is the ratio of Fabric Crepe (percent) divided by the average basis weight of the fabric-creped sheet, lbs/3000 square foot ream.

Velocity delta means a difference in speed.

Pusey and Jones hardness (indentation) is measured in accordance with ASTM D 531, and refers to the indentation number (standard specimen and conditions).

Nip parameters include, without limitation, nip pressure, nip length, backing roll hardness, fabric approach angle, fabric takeaway angle, uniformity, and velocity delta between surfaces of the nip.

Nip length means the length over which the nip surfaces are in contact.

During fabric creping in a pressure nip, the fiber is rearranged on the fabric, making the process tolerant of less than ideal forming conditions, as are sometimes seen with a Fourdrinier former. The forming section of a Fourdrinier machine includes two major parts, the headbox and the Fourdrinier Table. The latter consists of the wire run over the various drainage-controlling devices. The actual forming occurs along the Fourdrinier Table. The hydrodynamic effects of drainage, oriented shear, and turbulence generated along the table are generally the controlling factors in the forming process. Of course, the headbox also has an important influence in the process, usually on a scale that is much larger than the structural elements of the paper web, the fiber flocs. Thus the headbox may cause such large-scale effects as variations in distribution of flow rates, velocities, and concentrations across the full width of the machine; vortex streaks generated ahead of and aligned in the machine direction by the accelerating flow in the approach to the slice; and time-varying surges or pulsations of flow to the headbox. The existence of MD-aligned vortices in headbox discharges is common. Fourdrinier formers are further described in *The Sheet Forming Process*, Parker, J. D., Ed., TAPPI Press (1972, reissued 1994) Atlanta, Ga.

A translating transfer surface refers to the surface from which the web is creped into the creping fabric. The translating transfer surface may be the surface of a rotating drum as described hereafter, or may be the surface of a continuous smooth moving belt or another moving fabric which may have surface texture and so forth. The translating transfer surface needs to support the web and facilitate the high solids creping as will be appreciated from the discussion which follows.

The products of the present invention exhibit wet resiliency which is manifested in wet compressive recovery tests. A particularly convenient measure is Wet Springback Ratio which measures the ability of the product to elastically recover from compression. For measuring this parameter, each test specimen is prepared to consist of a stack of two or more conditioned (24 hours @ 50% RH, 73° F. (23° C.)) dry sample sheets cut to 2.5" (6.4 cm) squares, providing a stack mass preferably between 0.2 and 0.6 g. The test sequence begins with the treatment of the dry sample. Moisture is applied uniformly to the sample using a fine mist of deionized water to bring the moisture ratio (g water/g dry fiber) to approximately 1.1. This is done by applying 95-110% added moisture, based on the conditioned sample mass. This puts typical cellulosic materials in a moisture range where physical properties are relatively insensitive to moisture content (e.g., the sensitivity is much less than it is for moisture ratios less than 70%). The moistened sample is then placed in the test device. A programmable strength measurement device is used in compression mode to impart a specified series of compression cycles to the sample. Initial compression of the sample to 0.025 psi (0.172 kPa) provides an initial thickness (cycle A), after which two repetitions of loading up to 2 psi (13.8 kPa) are followed by unloading (cycles B and C). Finally, the sample is again compressed to 0.025 psi (0.172 kPa) to obtain a final thickness (cycle D). (Details of this procedure, including compression speeds, are given below).

Three measures of wet resiliency may be considered which are relatively insensitive to the number of sample layers used in the stack. The first measure is the bulk of the wet sample at 2 psi (13.8 kPa). This is referred to as the "Compressed Bulk". The second measure (more pertinent to the following examples) is termed "Wet Springback Ratio", which is the ratio of the moist sample thickness at 0.025 psi (0.172 kPa) at the end of the compression test (cycle D) to the thickness of the moist sample at 0.025 psi (0.172 kPa) measured at the beginning of the test (cycle A). The third measure is the "Loading Energy Ratio", which is the ratio of loading energy in the second compression to 2 psi (13.8 kPa) (cycle C) to that of the first compression to 2 psi (13.8 kPa) (cycle B) during the sequence described above, for a wetted sample. When load is plotted as a function of thickness, Loading Energy is the area under the curve as the sample goes from an unloaded state to the peak load of that cycle. For a purely elastic material, the spingback and loading energy ratio would be unity. The three measures described are relatively independent of the number of layers in the stack and serve as useful measures of wet resiliency. One may also refer to the Compression Ratio, which is defined as the ratio of moistened sample thickness at peak load in the first compression cycle to 2 psi (13.8 kPa) to the initial moistened thickness at 0.025 psi (0.172 kPa).

In carrying out the measurements of the wet compression recovery, samples should be conditioned for at least 24 hours under TAPPI conditions (50% RH, 73° F. (23° C.)). Specimens are die cut to 2.5"×2.5" (6.4×6.4 cm) squares. Conditioned sample weight should be near 0.4 g, if possible, and within the range of 0.25 to 0.6 g for meaningful comparisons. The target mass of 0.4 g is achieved by using a stack of 2 or more sheets if the sheet basis weight is less than 65 gsm. For example, for nominal 30 gsm sheets, a stack of 3 sheets will generally be near 0.4 g total mass.

Compression measurements are performed using an Instron® 4502 Universal Testing Machine interfaced with a 826 PC computer running Instron® Series XII software (1989 issue) and Version 2 firmware. A 100 kN load cell is used with 2.25" (5.72 cm) diameter circular platens for sample compression. The lower platen has a ball bearing assembly to allow exact alignment of the platens. The lower platen is locked in place while under load (30-100 lbf) (130-445 N) by the upper platen to ensure parallel surfaces. The upper platen must also be locked in place with the standard ring nut to eliminate play in the upper platen as load is applied.

Following at least one hour of warm-up after start-up, the instrument control panel is used to set the extensiometer to zero distance while the platens are in contact (at a load of 10-30 lb (4.5-13.6 kg)). With the upper platen freely suspended, the calibrated load cell is balanced to give a zero reading. The extensiometer and load cell; should be periodically checked to prevent baseline drift (shifting of the zero points). Measurements must be performed in a controlled humidity and temperature environment, according to TAPPI specifications (50%±2% RH and 73° F. (23° C.)). The upper platen is then raised to a height of 0.2 in. and control of the Instron is transferred to the computer.

Using the Instron Series XII Cyclic Test software, an instrument sequence is established with 7 markers (discrete events) composed of 3 cyclic blocks (instructions sets) in the following order:

Marker 1: Block 1
Marker 2: Block 2
Marker 3: Block 3
Marker 4: Block 2
Marker 5: Block 3
Marker 6: Block 1
Marker 7: Block 3.

Block 1 instructs the crosshead to descend at 1.5 in./min (3.8 cm/min) until a load of 0.1 lb (45 g) is applied (the Instron setting is −0.1 lb (−45 g), since compression is defined as negative force). Control is by displacement. When the targeted load is reached, the applied load is reduced to zero.

Block 2 directs that the crosshead range from an applied load of 0.05 lb (23 g) to a peak of 8 lb (3.6 kg) then back to 0.05 lb (23 g) at a speed of 0.4 in./min. (1.02 cm/min). Using the Instron software, the control mode is displacement, the limit type is load, the first level is −0.05 lb (−23 g), the second level is −8 lb (−3.6 kg), the dwell time is 0 sec., and the number of transitions is 2 (compression, then relaxation); "no action" is specified for the end of the block.

Block 3 uses displacement control and limit type to simply raise the crosshead to 0.2 in (0.51 cm) at a speed of 4 in./min. (10.2 cm/mm), with 0 dwell time. Other Instron software settings are 0 in first level, 0.2 in (0.51 cm) second level, 1 transition, and "no action" at the end of the block.

When executed in the order given above (Markers 1-7), the Instron sequence compresses the sample to 0.025 psi (0.1 lbf) [0.172 kPa (0.44 N)], relaxes, then compresses to 2 psi (8 lbs) [13.8 kPa (3.6 Kg)], followed by decompression and a crosshead rise to 0.2 in (0.51 cm), then compresses the sample again to 2 psi (13.8 kPa), relaxes, lifts the crosshead to 0.2 in. (0.51 cm), compresses again to 0.025 psi (0.1 lbf) [0.172 kPa (0.44 N)], and then raises the crosshead. Data logging should be performed at intervals no greater than every 0.02" (0.051 cm) or 0.4 lb (180 g), (whichever comes first) for Block 2 and for intervals no greater than 0.01 lb (4.5 g) for Block 1. Preferably, data logging is performed every 0.004 lb (1.8 g) in Block 1 and every 0.05 lb. (23 g) or 0.005 in. (0.13 mm) (whichever comes first) in Block 2.

The results output of the Series XII software is set to provide extension (thickness) at peak loads for Markers 1, 2, 4 and 6 (at each 0.025 (0.172 kPa) and 2.0 psi (13.8 kPa) peak load), the loading energy for Markers 2 and 4 (the two compressions to 2.0 psi (13.8 kPa) previously termed cycles B and C, respectively), and the ratio of final thickness to initial thickness (ratio of thickness at last to first 0.025 psi (0.172 kPa) compression). Load versus thickness results are plotted on the screen during execution of Blocks 1 and 2.

In performing a measurement, the dry, conditioned sample is moistened (deionized water at 72-73° F. (22.2-22.8° C.) is applied.). Moisture is applied uniformly with a fine mist to reach a moist sample mass of approximately 2.0 times the initial sample mass (95-110% added moisture is applied, preferably 100% added moisture, based on conditioned sample mass; this level of moisture should yield an absolute moisture ratio between 1.1 and 1.3 g. water/g. oven dry fiber—with oven dry referring to drying for at least 30 minutes in an oven at 105° C.). The mist should be applied uniformly to separated sheets (for stacks of more than 1 sheet), with spray applied to both front and back of each sheet to ensure uniform moisture application. This can be achieved using a conventional plastic spray bottle, with a container or other barrier blocking most of the spray, allowing only about the upper 10-20% of the spray envelope—a fine mist—to approach the sample. The spray source should be at least 10" away from the sample during spray application. In general, care must be applied to ensure that the sample is uniformly moistened by a fine spray. The sample must be weighed several times during the process of applying moisture to reach the targeted moisture content. No more than three minutes should elapse between the completion of the compression tests on the dry sample and the completion of moisture application. Allow 45-60 seconds from the final application of spray to the beginning of the subsequent compression test to provide time for internal wicking and absorption of the spray. Between three and four minutes will elapse between the completion of the dry compression sequence and initiation of the wet compression sequence.

Once the desired mass range has been reached, as indicated by a digital balance, the sample is centered on the lower Instron platen and the test sequence is initiated. Following the measurement, the sample is placed in a 105° C. oven for drying, and the oven dry weight will be recorded later (sample should be allowed to dry for 30-60 minutes, after which the dry weight is measured).

Creep recovery can occur between the two compression cycles to 2 psi (13.8 kPa), so the time between the cycles may be important. For the instrument settings used in these Instron tests, there is a 30 second period (±4 sec.) between the beginning of compression during the two cycles to 2 psi (13.8 kPa). The beginning of compression is defined as the point at which the load cell reading exceeds 0.03 lb. (13.6 g). Likewise, there is a 5-8 second interval between the beginning of compression in the first thickness measurement (ramp to 0.025 psi (0.172 kPa)) and the beginning of the subsequent compression cycle to 2 psi (13.8 kPa)). The interval between the beginning of the second compression cycle to 2 psi (13.8 kPa) and the beginning of compression for the final thickness measurement is approximately 20 seconds.

A creping adhesive is optionally used to secure the web to the transfer cylinder hereinafter described, and is preferred when a fabric-creped sheet is final-dried on a Yankee. The adhesive is preferably a hygroscopic, re-wettable, substantially non-crosslinking adhesive. Examples of preferred adhesives are those which include poly(vinyl alcohol) of the general class described in U.S. Pat. No. 4,528,316 to Soerens et al. Other suitable adhesives are disclosed in co-pending U.S. Provisional Patent Application Ser. No. 60/372,255, filed Apr. 12, 2002, entitled "Improved Creping Adhesive Modifier and Process for Producing Paper Products". The disclosures of the '316 patent and the '255 application are incorporated herein by reference. Suitable adhesives are optionally provided with modifiers and so forth. It is preferred to use crosslinker sparingly or not at all in the adhesive in many cases; such that the resin is substantially non-crosslinkable in use.

Creping adhesives may comprise a thermosetting or non-thermosetting resin, a film-forming semi-crystalline polymer and optionally an inorganic cross-linking agent as well as modifiers. Optionally, the creping adhesive of the present invention may also include any art-recognized components, including, but not limited to, organic cross linkers, hydrocarbons oils, surfactants, or plasticizers.

Creping modifiers which may be used include a quaternary ammonium complex comprising at least one non-cyclic amide. The quaternary ammonium complex may also contain one or several nitrogen atoms (or other atoms) that are capable of reacting with alkylating or quaternizing agents. These alkylating or quaternizing agents may contain zero, one, two, three or four non-cyclic amide containing groups. An amide containing group is represented by the following formula structure:

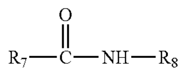

where $R_7$ and $R_8$ are non-cyclic molecular chains of organic or inorganic atoms.

Preferred non-cyclic bis-amide quaternary ammonium complexes can be of the formula:

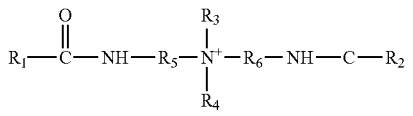

where $R_1$ and $R_2$ can be long chain non-cyclic saturated or unsaturated aliphatic groups; $R_3$ and $R_4$ can be long chain non-cyclic saturated or unsaturated aliphatic groups, a halogen, a hydroxide, an alkoxylated fatty acid, an alkoxylated fatty alcohol, a polyethylene oxide group, or an organic alcohol group; and $R_5$ and $R_6$ can be long chain non-cyclic saturated or unsaturated aliphatic groups. The modifier is present in the creping adhesive in an amount of from about 0.05% to about 50%, more preferably from about 0.25% to about 20%, and most preferably from about 1% to about 18% based on the total solids of the creping adhesive composition.

Modifiers include those obtainable from Goldschmidt Corporation of Essen/Germany or Process Application Corporation based in Washington Crossing, Pa. Appropriate creping modifiers from Goldschmidt Corporation include, but are not limited to, VARISOFT® 222LM, VARISOFT® 222, VARISOFT® 110, VARISOFT® 222LT, VARISOFT® 110 DEG, and VARISOFT® 238. Appropriate creping modifiers from Process Application Corporation include, but are not limited to, PALSOFT 580 FDA or PALSOFT 580C.

Other creping modifiers for use in the present invention include, but are not limited to, those compounds as described in WO/01/85109, which is incorporated herein by reference in its entirety.

Creping adhesives for use in connection with to the present invention may include any suitable thermosetting or non-thermosetting resin. Resins according to the present invention are preferably chosen from thermosetting and non-thermosetting polyamide resins or glyoxylated polyacrylamide resins. Polyamides for use in the present invention can be branched or unbranched, saturated or unsaturated.

Polyamide resins for use in the present invention may include polyaminoamide-epichlorohydrin (PAE) resins of the same general type employed as wet strength resins. PAE resins are described, for example, in "Wet-Strength Resins and Their Applications," Ch. 2, H. Epsy entitled Alkaline-Curing Polymeric Amine-Epichlorohydrin Resins, which is incorporated herein by reference in its entirety. Preferred PAE resins for use according to the present invention include a water-soluble polymeric reaction product of an epihalohydrin, preferably epichlorohydrin, and a water-soluble polyamide having secondary amine groups derived from a polyalkylene polyamine and a saturated aliphatic dibasic carboxylic acid containing from about 3 to about 10 carbon atoms.

A non-exhaustive list of non-thermosetting cationic polyamide resins can be found in U.S. Pat. No. 5,338,807, issued to Espy et al. and incorporated herein by reference. The non-thermosetting resin may be synthesized by directly reacting the polyamides of a dicarboxylic acid and methyl bis(3-aminopropyl)amine in an aqueous solution, with epichlorohydrin. The carboxylic acids can include saturated and unsaturated dicarboxylic acids having from about 2 to 12 carbon atoms, including for example, oxalic, malonic, succinic, glutaric, adipic, pilemic, suberic, azelaic, sebacic, maleic, itaconic, phthalic, and terephthalic acids. Adipic and glutaric acids are preferred, with adipic acid being the most preferred. The esters of the aliphatic dicarboxylic acids and aromatic dicarboxylic acids, such as the phathalic acid, may be used, as well as combinations of such dicarboxylic acids or esters.

Thermosetting polyamide resins for use in the present invention may be made from the reaction product of an epihalohydrin resin and a polyamide containing secondary amine or tertiary amines. In the preparation of such a resin, a dibasic carboxylic acid is first reacted with the polyalkylene polyamine, optionally in aqueous solution, under conditions suitable to produce a water-soluble polyamide. The preparation of the resin is completed by reacting the water-soluble amide with an epihalohydrin, particularly epichlorohydrin, to form the water-soluble thermosetting resin.

The of preparation of water soluble, thermosetting polyamide-epihalohydrin resin is described in U.S. Pat. Nos. 2,926,116; 3,058,873; and 3,772,076 issued to Kiem, all of which are incorporated herein by reference in their entirety.

The polyamide resin may be based on DETA instead of a generalized polyamine. Two examples of structures of such a polyamide resin are given below. Structure 1 shows two types of end groups: a di-acid and a mono-acid based group:

STRUCTURE 1

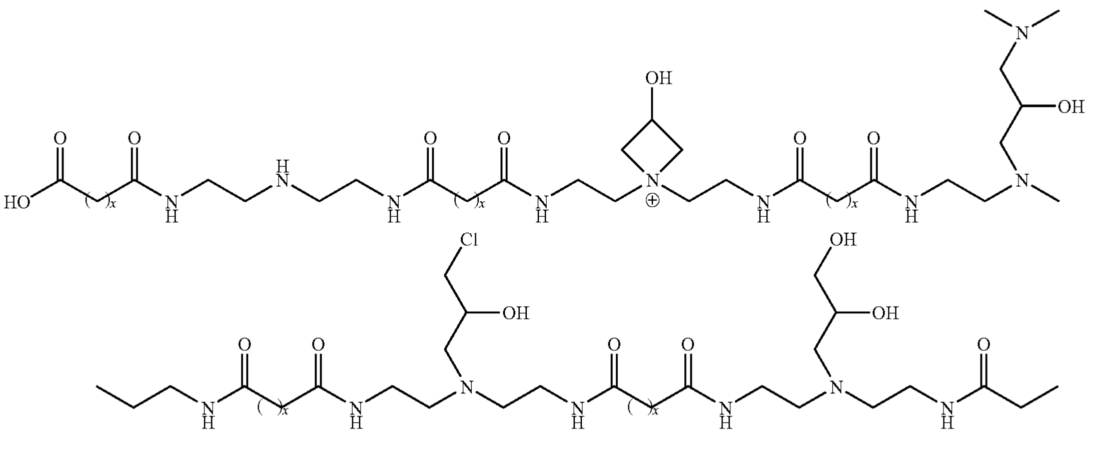

Structure 2 shows a polymer with one end-group based on a di-acid group and the other end-group based on a nitrogen group:

STRUCTURE 2

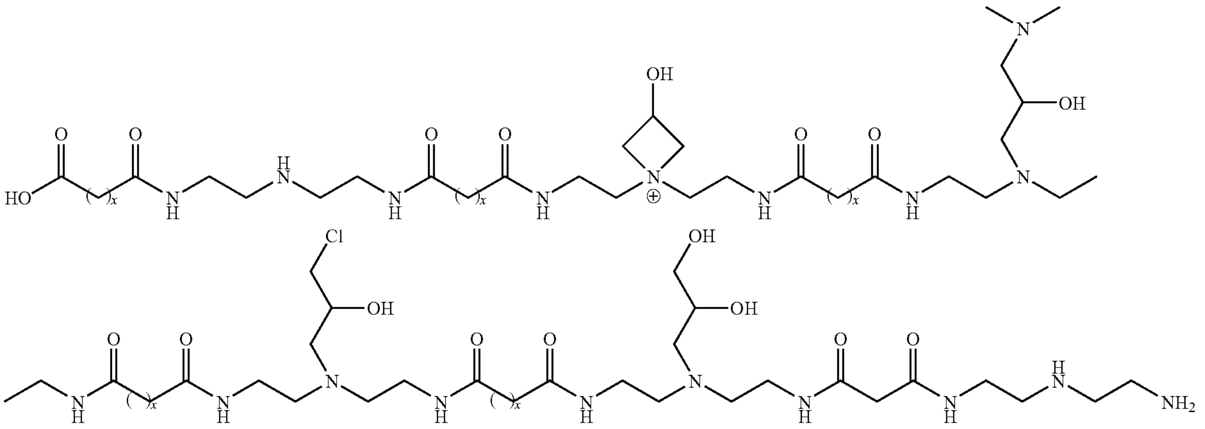

Note that although both structures are based on DETA, other polyamines may be used to form this polymer, including those, which may have tertiary amide side chains.

The polyamide resin has a viscosity of from about 80 to about 800 centipoise and a total solids of from about 5% to about 40%. The polyamide resin is present in the creping adhesive according to the present invention in an amount of from about 0% to about 99.5%. According to another embodiment, the polyamide resin is present in the creping adhesive in an amount of from about 20% to about 80%. In yet another embodiment, the polyamide resin is present in the creping adhesive in an amount of from about 40% to about 60% based on the total solids of the creping adhesive composition.

Polyamide resins for use according to the present invention can be obtained from Ondeo-Nalco Corporation, based in Naperville, Ill., and Hercules Corporation, based in Wilmington, Del. Creping adhesive resins for use according to the present invention from Ondeo-Nalco Corporation include, but are not limited to, CREPECCEL® 675NT, CREPECCEL® 675P and CREPECCEL® 690HA. Appropriate creping adhesive resins available from Hercules Corporation include, but are not limited to, HERCULES 82-176, Unisoft 805 and CREPETROL A-6115.

Other polyamide resins for use according to the present invention include, for example, those described in U.S. Pat. Nos. 5,961,782 and 6,133,405, both of which are incorporated herein by reference.

The creping adhesive may also comprise a film-forming semi-crystalline polymer. Film-forming semi-crystalline polymers for use in the present invention can be selected from, for example, hemicellulose, carboxymethyl cellulose, and most preferably includes polyvinyl alcohol (PVOH). Polyvinyl alcohols used in the creping adhesive can have an average molecular weight of about 13,000 to about 124,000 daltons. According to one embodiment, the polyvinyl alcohols have a degree of hydrolysis of from about 80% to about 99.9%. According to another embodiment, polyvinyl alcohols have a degree of hydrolysis of from about 85% to about 95%. In yet another embodiment, polyvinyl alcohols have a degrees of hydrolysis of from about 86% to about 90%. Also, according to one embodiment, polyvinyl alcohols preferably have a viscosity, measured at 20 degree centigrade using a 4% aqueous solution, of from about 2 to about 100 centipoise.

According to another embodiment, polyvinyl alcohols have a viscosity of from about 10 to about 70 centipoise. In yet another embodiment, polyvinyl alcohols have a viscosity of from about 20 to about 50 centipoise.

Typically, the polyvinyl alcohol is present in the creping adhesive in an amount of from about 10% to 90% or 20% to about 80% or more. In some embodiments, the polyvinyl alcohol is present in the creping adhesive in an amount of from about 40% to about 60%, by weight, based on the total solids of the creping adhesive composition.

Polyvinyl alcohols for use according to the present invention include those obtainable from Monsanto Chemical Co. and Celanese Chemical. Appropriate polyvinyl alcohols from Monsanto Chemical Co. include Gelvatols, including, but not limited to, GELVATOL 1-90, GELVATOL 3-60, GELVATOL 20-30, GELVATOL 1-30, GELVATOL 20-90, and GELVATOL 20-60. Regarding the Gelvatols, the first number indicates the percentage residual polyvinyl acetate and the next series of digits when multiplied by 1,000 gives the number corresponding to the average molecular weight.

Celanese Chemical polyvinyl alcohol products for use in the creping adhesive (previously named Airvol products from Air Products until October 2000) are listed below:

TABLE 1

Polyvinyl Alcohol for Creping Adhesive

| Grade | % Hydrolysis, | Viscosity, cps[1] | pH | Volatiles, % Max. | Ash, % Max.[3] |
|---|---|---|---|---|---|
| | | Super Hydrolyzed | | | |
| Celvol 125 | 99.3+ | 28-32 | 5.5-7.5 | 5 | 1.2 |
| Celvol 165 | 99.3+ | 62-72 | 5.5-7.5 | 5 | 1.2 |
| | | Fully Hydrolyzed | | | |
| Celvol 103 | 98.0-98.8 | 3.5-4.5 | 5.0-7.0 | 5 | 1.2 |
| Celvol 305 | 98.0-98.8 | 4.5-5.5 | 5.0-7.0 | 5 | 1.2 |
| Celvol 107 | 98.0-98.8 | 5.5-6.6 | 5.0-7.0 | 5 | 1.2 |
| Celvol 310 | 98.0-98.8 | 9.0-11.0 | 5.0-7.0 | 5 | 1.2 |
| Celvol 325 | 98.0-98.8 | 28.0-32.0 | 5.0-7.0 | 5 | 1.2 |
| Celvol 350 | 98.0-98.8 | 62-72 | 5.0-7.0 | 5 | 1.2 |
| | | Intermediate Hydrolyzed | | | |
| Celvol 418 | 91.0-93.0 | 14.5-19.5 | 4.5-7.0 | 5 | 0.9 |
| Celvol 425 | 95.5-96.5 | 27-31 | 4.5-6.5 | 5 | 0.9 |
| | | Partially Hydrolyzed | | | |
| Celvol 502 | 87.0-89.0 | 3.0-3.7 | 4.5-6.5 | 5 | 0.9 |
| Celvol 203 | 87.0-89.0 | 3.5-4.5 | 4.5-6.5 | 5 | 0.9 |
| Celvol 205 | 87.0-89.0 | 5.2-6.2 | 4.5-6.5 | 5 | 0.7 |
| Celvol 513 | 86.0-89.0 | 13-15 | 4.5-6.5 | 5 | 0.7 |
| Celvol 523 | 87.0-89.0 | 23-27 | 4.0-6.0 | 5 | 0.5 |
| Celvol 540 | 87.0-89.0 | 45-55 | 4.0-6.0 | 5 | 0.5 |

[1]4% aqueous solution, 20

The creping adhesive may also comprise one or more inorganic cross-linking salts or agents. Such additives are believed best used sparingly or not at all in connection with the present invention. A non-exhaustive list of multivalent metal ions includes calcium, barium, titanium, chromium, manganese, iron, cobalt, nickel, zinc, molybdenium, tin, antimony, niobium, vanadium, tungsten, selenium, and zirconium. Mixtures of metal ions can be used. Preferred anions include acetate, formate, hydroxide, carbonate, chloride, bromide, iodide, sulfate, tartrate, and phosphate. An example of a preferred inorganic cross-linking salt is a zirconium salt. The zirconium salt for use according to one embodiment of the present invention can be chosen from one or more zirconium compounds having a valence of plus four, such as ammonium zirconium carbonate, zirconium acetylacetonate, zirconium acetate, zirconium carbonate, zirconium sulfate, zirconium phosphate, potassium zirconium carbonate, zirconium sodium phosphate, and sodium zirconium tartrate. Appropriate zirconium compounds include, for example, those described in U.S. Pat. No. 6,207,011, which is incorporated herein by reference.

The inorganic cross-linking salt can be present in the creping adhesive in an amount of from about 0% to about 30%. In another embodiment, the inorganic cross-linking agent can be present in the creping adhesive in an amount of from about 1% to about 20%. In yet another embodiment, the inorganic cross-linking salt can be present in the creping adhesive in an amount of from about 1% to about 10% by weight based on the total solids of the creping adhesive composition. Zirconium compounds for use according to the present invention include those obtainable from EKA Chemicals Co. (previously Hopton Industries) and Magnesium Elektron, Inc. Appropriate commercial zirconium compounds from EKA Chemicals Co. are AZCOTE 5800M and KZCOTE 5000 and from Magnesium Elektron, Inc. are AZC or KZC.

Optionally, the creping adhesive according to the present invention can include any other art recognized components, including, but not limited to, organic cross-linkers, hydrocarbon oils, surfactants, amphoterics, humectants, plasticizers, or other surface treatment agents. An extensive, but non-exhaustive, list of organic cross-linkers includes glyoxal, maleic anhydride, bismaleimide, bis acrylamide, and epihalohydrin. The organic cross-linkers can be cyclic or non-cyclic compounds. Plastizers for use in the present invention can include propylene glycol, diethylene glycol, triethylene glycol, dipropylene glycol, and glycerol.

The creping adhesive may be applied as a single composition or may be applied in its component parts. More particularly, the polyamide resin may be applied separately from the polyvinyl alcohol (PVOH) and the modifier.

According to the present invention, an absorbent paper web is made by dispersing papermaking fibers into aqueous furnish (slurry) and depositing the aqueous furnish onto the forming wire of a papermaking machine. Any suitable forming scheme might be used. For example, an extensive but non-exhaustive list in addition to Fourdrinier formers includes a crescent former, a C-wrap twin wire former, an S-wrap twin wire former, or a suction breast roll former. The forming fabric can be any suitable foraminous member including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808 all of which are incorporated herein by reference in their entirety. One forming fabric particularly useful with the present invention is Voith Fabrics Forming Fabric 2164 made by Voith Fabrics Corporation, Shreveport, La.

Foam-forming of the aqueous furnish on a forming wire or fabric may be employed as a means for controlling the permeability or void volume of the sheet upon wet-creping. Foam-forming techniques are disclosed in U.S. Pat. No. 4,543,156 and Canadian Patent No. 2,053,505, the disclosures of which are incorporated herein by reference. The foamed fiber furnish is made up from an aqueous slurry of fibers mixed with a foamed liquid carrier just prior to its introduction to the headbox. The pulp slurry supplied to the system has a consistency in the range of from about 0.5 to about 7 weight percent fibers, preferably in the range of from about 2.5 to about 4.5 weight percent. The pulp slurry is added to a foamed liquid comprising water, air and surfactant containing 50 to 80 percent air by volume forming a foamed fiber furnish having a consistency in the range of from about 0.1 to about 3 weight percent fiber by simple mixing from natural turbulence and mixing inherent in the process elements. The addition of the pulp as a low consistency slurry results in excess foamed liquid recovered from the forming wires. The excess foamed liquid is discharged from the system and may be used elsewhere or treated for recovery of surfactant therefrom.

The furnish may contain chemical additives to alter the physical properties of the paper produced. These chemistries are well understood by the skilled artisan and may be used in any known combination. Such additives may be surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof; said chemicals optionally comprising polyols, starches, PPG esters, PEG esters, phospholipids, surfactants, polyamines, HMCP or the like.

The pulp can be mixed with strength adjusting agents such as wet strength agents, dry strength agents and debonders/softeners and so forth. Suitable wet strength agents are known to the skilled artisan. A comprehensive but non-exhaustive list of useful strength aids include urea-formaldehyde resins, melamine formaldehyde resins, glyoxylated polyacrylamide resins, polyamide-epichlorohydrin resins and the like. Thermosetting polyacrylamides are produced by reacting acrylamide with diallyl dimethyl ammonium chloride (DADMAC) to produce a cationic polyacrylamide copolymer which is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entirety. Resins of this type are commercially available under the trade name of PAREZ 631NC by Bayer Corporation. Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene 557LX and Kymene 557H by Hercules Incorporated of Wilmington, Del. and Amres® from Georgia-Pacific Resins, Inc. These resins and the process for making the resins are described in U.S. Pat. No. 3,700,623 and U.S. Pat. No. 3,772,076 each of which is incorporated herein by reference in its entirety. An extensive description of polymeric-epihalohydrin resins is given in Chapter 2: *Alkaline-Curing Polymeric Amine-Epichlorohydrin* by Espy in *Wet Strength Resins and Their Application* (L. Chan, Editor, 1994), herein incorporated by reference in its entirety. A reasonably comprehensive list of wet strength resins is described by Westfelt in *Cellulose Chemistry and Technology* Volume 13, p. 813, 1979, which is incorporated herein by reference.

Suitable temporary wet strength agents may likewise be included. A comprehensive but non-exhaustive list of useful temporary wet strength agents includes aliphatic and aromatic aldehydes including glyoxal, malonic dialdehyde, succinic dialdehyde, glutaraldehyde and dialdehyde starches, as well as substituted or reacted starches, disaccharides, polysaccharides, chitosan, or other reacted polymeric reaction products of monomers or polymers having aldehyde groups, and optionally, nitrogen groups. Representative nitrogen containing polymers, which can suitably be reacted with the aldehyde containing monomers or polymers, includes vinyl-amides, acrylamides and related nitrogen containing polymers. These polymers impart a positive charge to the aldehyde containing reaction product. In addition, other commercially available temporary wet strength agents, such as, PAREZ 745, manufactured by Cytec can be used, along with those disclosed, for example in U.S. Pat. No. 4,605,702.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769 and 5,217,576. Modified starches sold under the trademarks CO-BOND® 1000 and CO-BOND® 1000 Plus, by National Starch and Chemical Company of Bridgewater, N.J. may be used. Prior to use, the cationic aldehydic water soluble polymer can be prepared by preheating an aqueous slurry of approximately 5% solids maintained at a temperature of approximately 240 degrees Fahrenheit and a pH of about 2.7 for approximately 3.5 minutes. Finally, the slurry can be quenched and diluted by adding water to produce a mixture of approximately 1.0% solids at less than about 130 degrees Fahrenheit.

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

Temporary wet strength agents such as glyoxylated polyacrylamide can be used. Temporary wet strength agents such glyoxylated polyacrylamide resins are produced by reacting acrylamide with diallyl dimethyl ammonium chloride (DADMAC) to produce a cationic polyacrylamide copolymer which is ultimately reacted with glyoxal to produce a cationic cross-linking temporary or semi-permanent wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference. Resins of this type are commercially available under the trade name of PAREZ 631NC, by Cytec Industries. Different mole ratios of acrylamide/DADMAC/glyoxal can be used to produce cross-linking resins, which are useful as wet strength agents. Furthermore, other dialdehydes can be substituted for glyoxal to produce wet strength characteristics.

Suitable dry strength agents include starch, guar gum, polyacrylamides, carboxymethyl cellulose and the like. Of particular utility is carboxymethyl cellulose, an example of which is sold under the trade name Hercules CMC, by Hercules Incorporated of Wilmington, Del. According to one embodiment, the pulp may contain from about 0 to about 15 lb/ton of dry strength agent. According to another embodiment, the pulp may contain from about 1 to about 5 lbs/ton of dry strength agent.

Suitable debonders are likewise known to the skilled artisan. Debonders or softeners may also be incorporated into the pulp or sprayed upon the web after its formation. The present invention may also be used with softener materials including but not limited to the class of amido amine salts derived from partially acid neutralized amines. Such materials are disclosed in U.S. Pat. No. 4,720,383. Evans, *Chemistry and Industry,* 5 Jul. 1969, pp. 893-903; Egan, *J. Am. Oil Chemist's Soc.*, Vol. 55 (1978), pp. 118-121; and Trivedi et al., *J. Am. Oil Chemist's Soc.*, June 1981, pp. 754-756, incorporated by reference in their entirety, indicate that softeners are often available commercially only as complex mixtures rather than as single compounds. While the following discussion will focus on the predominant species, it should be understood that commercially available mixtures would generally be used in practice.

Quasoft 202-JR is a suitable softener material, which may be derived by alkylating a condensation product of oleic acid and diethylenetriamine. Synthesis conditions using a deficiency of alkylation agent (e.g., diethyl sulfate) and only one alkylating step, followed by pH adjustment to protonate the non-ethylated species, result in a mixture consisting of cationic ethylated and cationic non-ethylated species. A minor proportion (e.g., about 10%) of the resulting amido amine cyclize to imidazoline compounds. Since only the imidazoline portions of these materials are quaternary ammonium compounds, the compositions as a whole are pH-sensitive. Therefore, in the practice of the present invention with this class of chemicals, the pH in the head box should be approximately 6 to 8, more preferably 6 to 7 and most preferably 6.5 to 7.

Quaternary ammonium compounds, such as dialkyl dimethyl quaternary ammonium salts are also suitable particularly when the alkyl groups contain from about 10 to 24 carbon atoms. These compounds have the advantage of being relatively insensitive to pH.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonium compounds, quaternized amine-esters, and biodegradable vegetable oil based esters functional with quaternary ammonium chloride and diester dierucyldimethyl ammonium chloride and are representative biodegradable softeners.

In some embodiments, a particularly preferred debonder composition includes a quaternary amine component as well as a nonionic surfactant.

Suitable creping fabrics include single layer, multi-layer, or composite preferably open meshed structures. Fabrics may have at least one of the following characteristics: (1) on the side of the creping fabric that is in contact with the wet web (the "top" side), the number of machine-direction (MD) strands per inch (mesh) is from 10 to 200 and the number of cross-direction (CD) strands per inch (count) is also from 10 to 200; (2) The strand diameter is typically smaller than 0.050 inch; (3) on the top side, the distance between the highest point of the MD knuckles and the highest point on the CD knuckles is from about 0.001 to about 0.02 or 0.03 inch; (4) In between these two levels there can be knuckles formed either by MD or CD strands that give the topography a three dimensional hill/valley appearance which is imparted to the sheet during the fabric creping step; (5) The fabric may be oriented in any suitable way so as to achieve the desired effect on processing and on properties in the product; the long warp knuckles may be on the top side to increase MD ridges in the product, or the long shute knuckles may be on the top side if more CD ridges are desired to influence creping characteristics as the web is transferred from the transfer cylinder to the creping fabric; and (6) the fabric may be made to show certain geometric patterns that are pleasing to the eye, which is typically repeated between every two to 50 warp yarns. Suitable commercially available coarse fabrics include a number of fabrics made by Voith Fabrics.

The creping fabric may thus be of the class described in U.S. Pat. No. 5,607,551 to Farrington et al, Cols. 7-8 thereof, as well as the fabrics described in U.S. Pat. No. 4,239,065 to Trokhan and U.S. Pat. No. 3,974,025 to Ayers. Such fabrics may have about 20 to about 60 meshes per inch and are formed from monofilament polymeric fibers having diameters typically ranging from about 0.008 to about 0.025 inches. Both warp and weft monofilaments may, but need not necessarily be of the same diameter.

In some cases the filaments are so woven and complimentarily serpentinely configured in at least the Z-direction (the thickness of the fabric) to provide a first grouping or array of coplanar top-surface-plane crossovers of both sets of filaments; and a predetermined second grouping or array of sub-top-surface crossovers. The arrays are interspersed so that portions of the top-surface-plane crossovers define an array of wicker-basket-like cavities in the top surface of the fabric which cavities are disposed in staggered relation in both the machine direction (MD) and the cross-machine direction (CD), and so that each cavity spans at least one sub-top-surface crossover. The cavities are discretely perimetrically enclosed in the plan view by a picket-like-lineament comprising portions of a plurality of the top-surface plane crossovers. The loop of fabric may comprise heat set monofilaments of thermoplastic material; the top surfaces of the coplanar top-surface-plane crossovers may be monoplanar flat surfaces. Specific embodiments of the invention include satin weaves as well as hybrid weaves of three or greater sheds, and mesh counts of from about 10×10 to about 120×120 filaments per inch (4×4 to about 47×47 per centimeter). Although the preferred range of mesh counts is from about 18 by 16 to about 55 by 48 filaments per inch (9×8 to about 22×19 per centimeter).

Instead of a creping fabric as described immediately above, an alternative fabric such as a dryer fabric may be used for creping fabric if so desired. Suitable fabrics are described in U.S. Pat. No. 5,449,026 (woven style) and U.S. Pat. No. 5,690,149 (stacked MD tape yarn style) to Lee as well as U.S. Pat. No. 4,490,925 to Smith (spiral style).

Fabrics used in connection with drying the sheet before fabric creping and/or in connection with a rush transfer prior to fabric creping may be either those fabrics described as creping fabrics or dryer fabrics above.

A rush transfer is optionally performed prior to fabric creping from the transfer surface. A rush transfer is carried out at a web consistency of from about 10 to 30 percent, preferably less than 30 percent and occurs as a fixed gap transfer as opposed to fabric creping under pressure. Typically a rush transfer is carried out at a Rush Transfer of from about 10 to about 30 percent at a consistency of from about 10 to about 30 percent, while a high solids fabric crepe in a pressure nip is usually at a consistency of at least 35 percent. Further details as to Rush Transfer appear in U.S. Pat. No. 4,440,597 to Wells et al. Typically, rush transfer is carried out using vacuum to assist in detaching the web from the donor fabric and thereafter attaching it to the receiving or receptor fabric. In contrast, vacuum is not required in a fabric creping step, so accordingly when we refer to fabric creping as being "under pressure" we are referring to loading of the receptor fabric against the transfer surface although vacuum assist can be employed at the expense of further complication of the system so long as the amount of vacuum is not sufficient to interfere with rearrangement or redistribution of the fiber.

Without intending to be bound by theory, it is believed that redistribution of fiber from a generally random structure to a pattern is achieved by an appropriate selection of consistency, fabric pattern, nip parameters, and velocity delta, the difference in speed between the transfer surface and creping belt. Velocity deltas of at least 100 fpm, 200 fpm, 500 fpm, 1000 fpm, 1500 fpm or even in excess of 2000 fpm may be needed under some conditions to achieve the desired redistribution of fiber and combination of properties as will become apparent from the discussion which follows. In many cases, velocity deltas of from about 500 fpm to about 2000 fpm will suffice. The products of a fabric crepe process are compared with conventional products as in Table 2 below.

TABLE 2

| Comparison of Typical Web Properties | | | |
|---|---|---|---|
| Property | Conventional Wet Press | Conventional Throughdried | Can Dry, Fabric Crepe |
| SAT g/g | 4 | 10 | 5-10 |
| *Bulk | 40 | 120+ | 50-115 |
| MD/CD Tensile | >1 | >1 | <1 |
| CD Stretch (%) | 3-4 | 7-10 | 5-10 |

*mils/8sheet

The present invention offers the advantage that relatively low grade, or otherwise available energy sources may be used to provide the thermal energy used to dry the web. That is to say, it is not necessary in accordance with the invention to provide through drying quality heated air or heated air suitable for a drying hood inasmuch as the dryer cans may be heated from any source including waste recovery or thermal recovery from a co-generation source, for example.

Another advantage of the invention is that it may utilize existing manufacturing assets such as can dryers and Fourdrinier formers of flat paper machines in order to make premium basesheet for tissue and towel, thus lowering dramatically the required capital investment to make premium products.

When we refer herein to drying the web while it is held "in the creping fabric" or use like terminology, we mean that a substantial portion of the web protrudes into the interstices of the creping fabric, while of course another substantial portion of the web lies in close contact therewith.

One preferred way of practicing the invention includes can-drying the web while it is in contact with the creping fabric which also serves as the drying fabric. Can drying can be used alone or in combination with impingement air drying, the combination being especially convenient if a two tier drying section layout is available as hereinafter described. Impingement air drying may also be used as the only means of drying the web as it is held in the creping fabric if so desired. Suitable rotary impingement air drying equipment is described in U.S. Pat. No. 6,432,267 to Watson and U.S. Pat. No. 6,447,640 to Watson et al. Inasmuch as the process of the invention can readily be practiced on existing equipment, any existing flat dryers can be advantageously employed so as to conserve capital as well.

Figure 2:
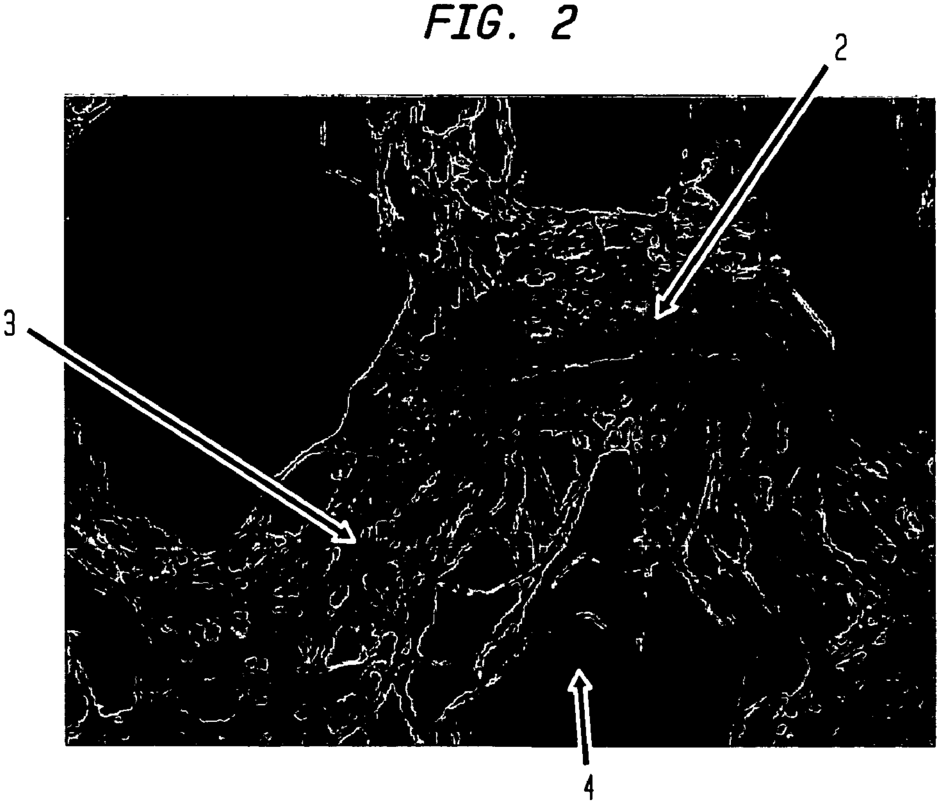
FIG. 2 is a photomicrograph showing enlarged detail (32×) of the web of FIG. 1.

The various core constructions are appreciated by reference to FIGS. 1 through 19. FIG. 1 is a photomicrograph of a very low basis weight, open mesh web 1 having a plurality of relatively high basis weight pileated 2 interconnected by a plurality of lower basis weight linking 3. The cellulosic fibers of linking 3 have orientation which is biased along the direction as to which they extend between pileated 2, as is perhaps best seen in the enlarged view of FIG. 2. The orientation and variation in local basis weight is surprising in view of the fact that the nascent web has an apparent random fiber orientation when formed and is transferred largely undisturbed to a transfer surface prior to being wet-creped therefrom. The imparted ordered structure is distinctly seen at extremely low basis weights where web 1 has open portions 4 and is thus an open mesh structure having fiber-deprived cellules with devoid of fiber, referred to as voids.

Figure 3:
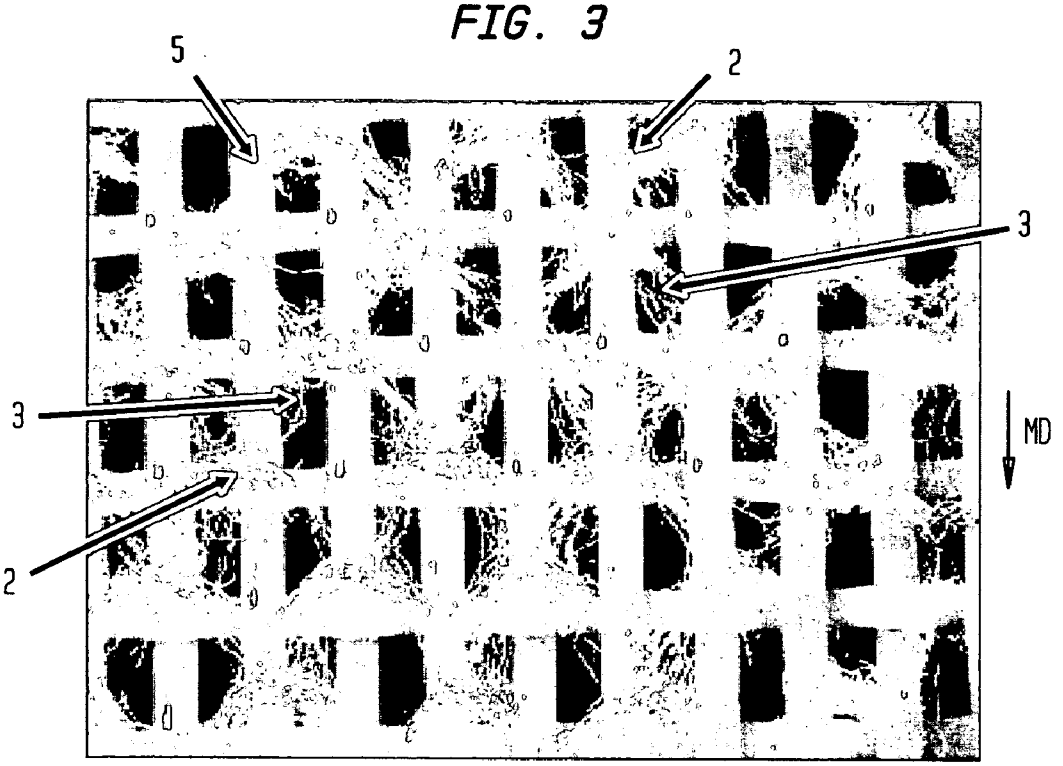
FIG. 3 is a photomicrograph (8×) showing the open mesh web of FIG. 1 placed on the creping fabric used to manufacture the web.

FIG. 3 shows a web together with the creping fabric 5 upon which the fibers were redistributed in a wet-creping nip after generally random formation to a consistency of 40-50 percent or so prior to creping from the transfer cylinder.

Figure 4:
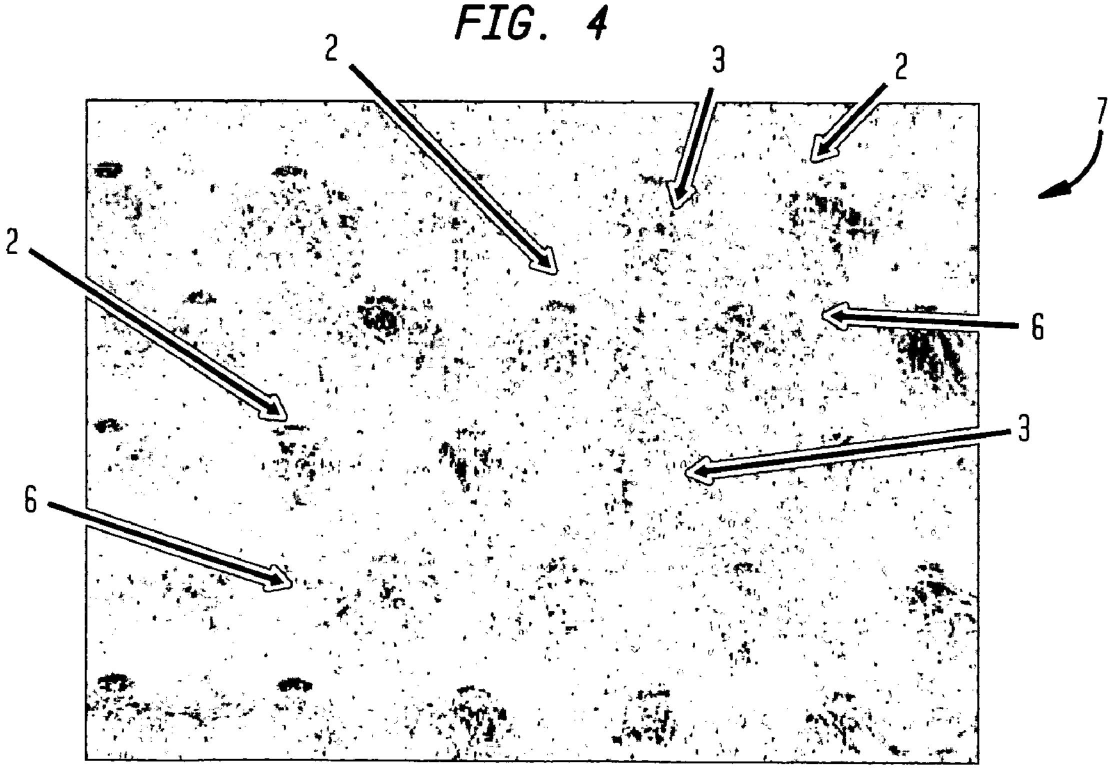
FIG. 4 is a photomicrograph showing a web having a basis weight of 19 lbs/ream produced with a 17% Fabric Crepe.
Figure 5:
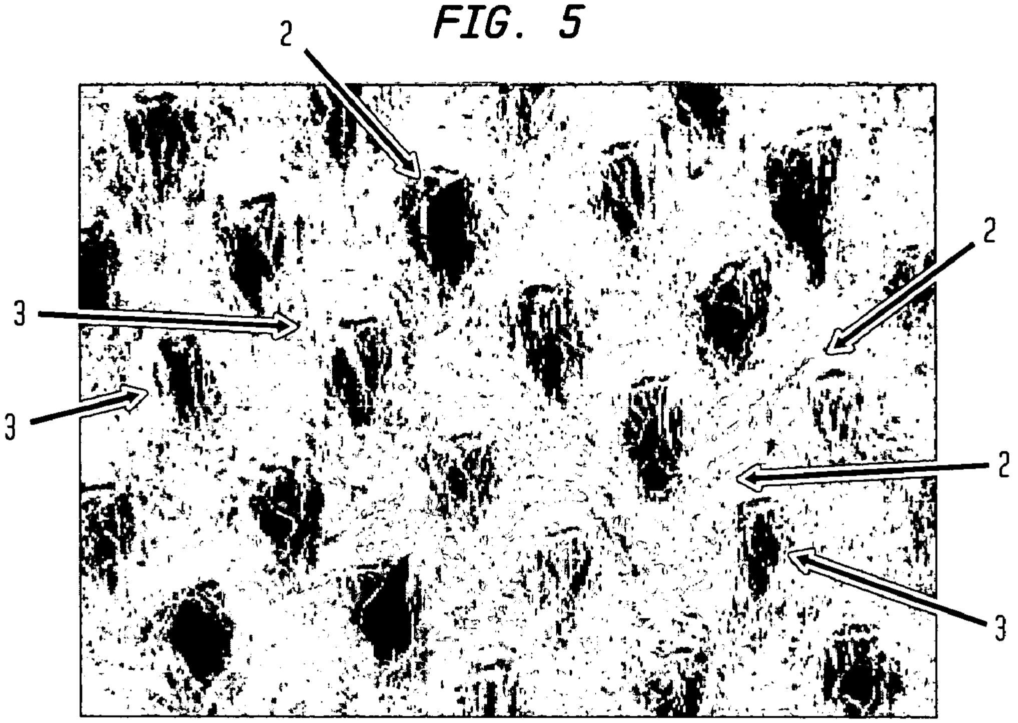
FIG. 5 is a photomicrograph showing a web having a basis weight of 19 lbs/ream produced with a 40% Fabric Crepe.
Figure 6:
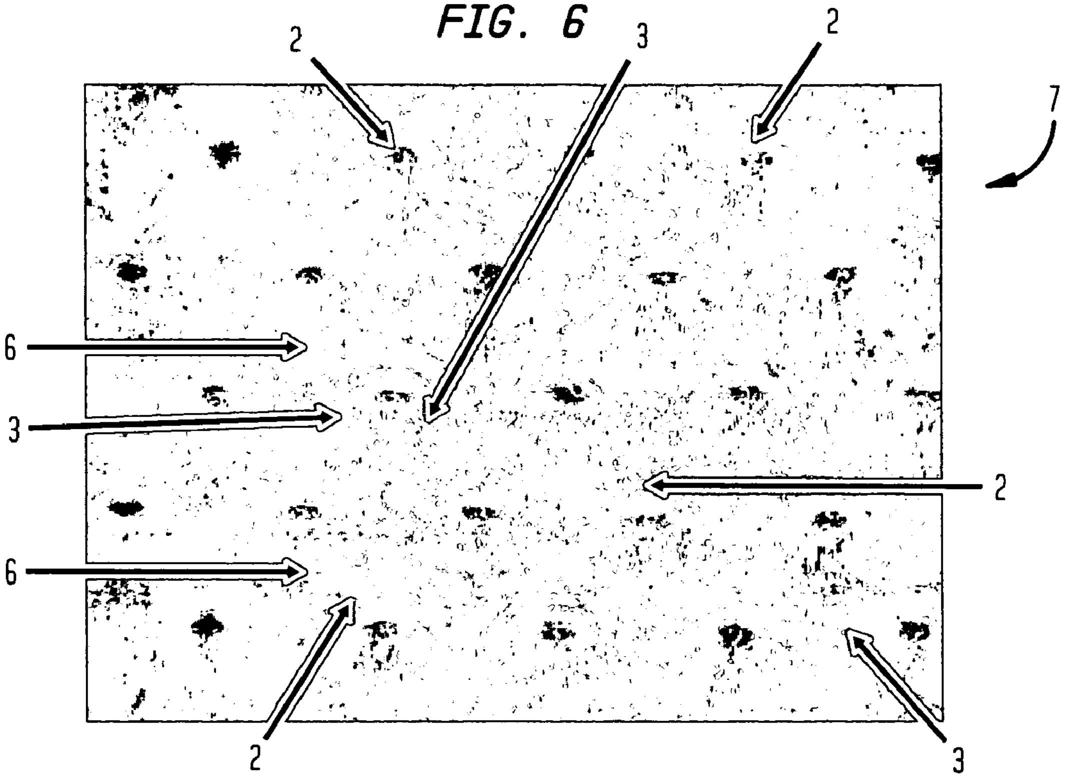
FIG. 6 is a photomicrograph showing a web having a basis weight of 27 lbs/ream produced with a 28% Fabric Crepe.

While the structure including the pileated and reoriented is easily observed in open meshed embodiments of very low basis weight, the ordered structure of the products of the invention is likewise seen when basis weight is increased where integument of fiber 6 span the pileated and linking as is seen in FIGS. 4 through 6 so that a sheet 7 is provided with substantially continuous surfaces as is seen particularly in FIGS. 4 and 6, where the darker are lower in basis weight while the almost solid white regions are relatively compressed fiber.

The impact of processing variables and so forth are also appreciated from FIGS. 4 through 6. FIGS. 4 and 5 both show 19 lb sheet; however, the pattern in terms of variation in basis weight is more prominent in FIG. 5 because the Fabric Crepe was much higher (40% vs. 17%). Likewise, FIG. 6 shows a higher basis weight web (27 lb) at 28% crepe where the pileated, linking and integument are all prominent.

Redistribution of fibers from a generally random arrangement into a patterned distribution including orientation bias as well as fiber enriched regions corresponding to the creping fabric structure is still further appreciated by reference to FIGS. 7 through 18.

Figure 7:
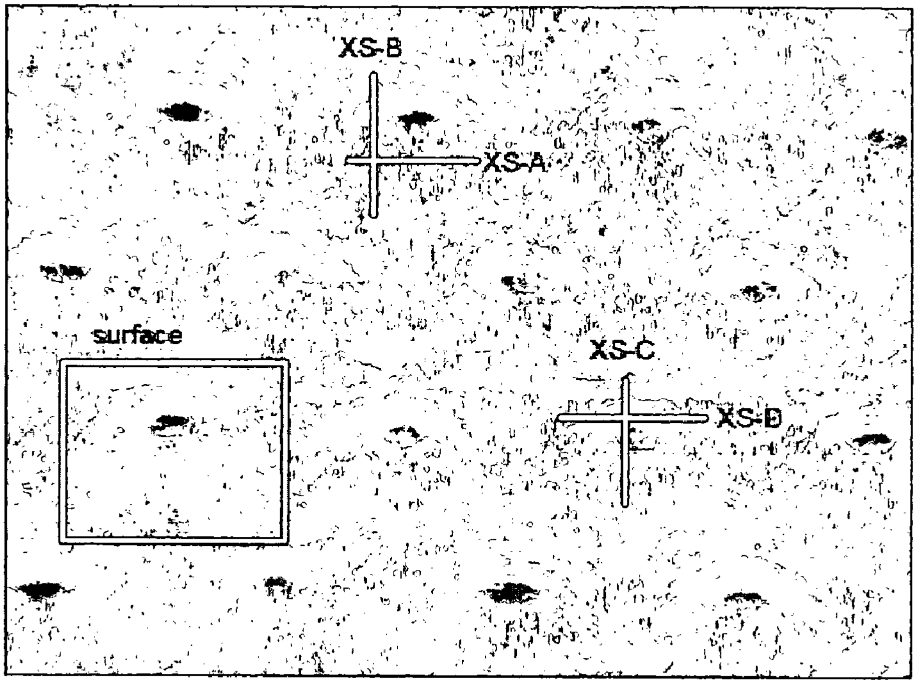
FIG. 7 is a surface image (10×) of an absorbent sheet, indicating areas where samples for surface and section SEMs were taken.
Figure 8:
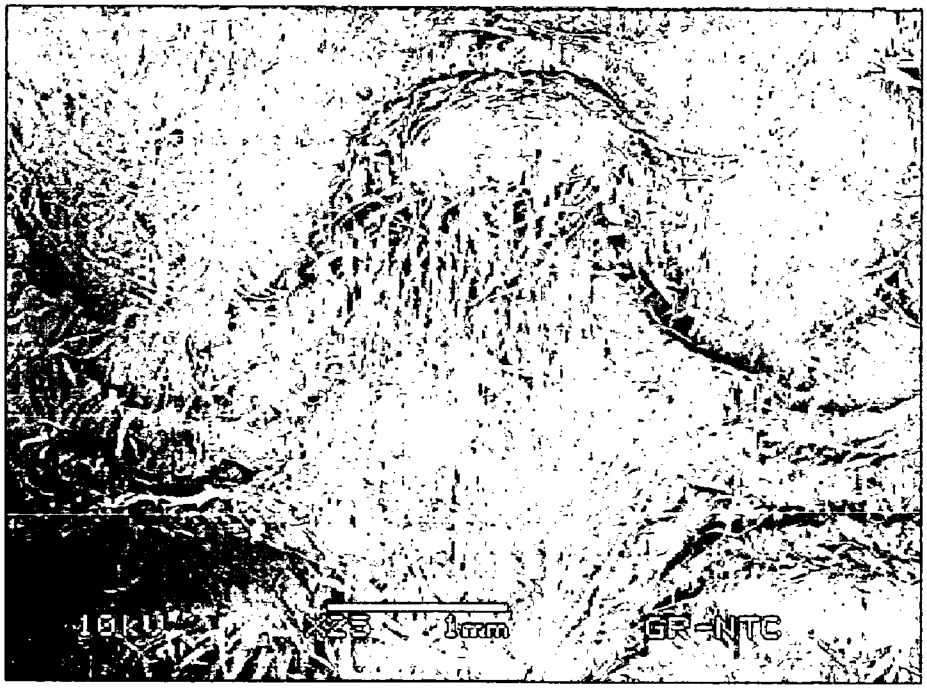
FIGS. 8-10 are surface SEMs of a sample of material taken from the sheet seen in FIG. 7.
Figure 9:
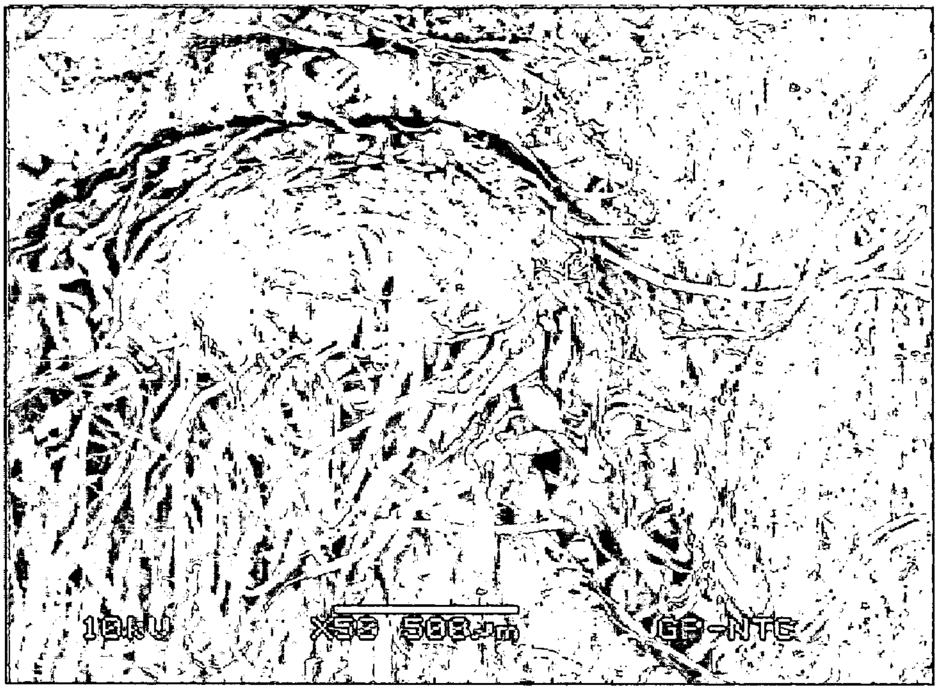
Figure 10:

FIG. 7 is a photomicrograph (10×) showing a cellulosic web from which a series of samples were prepared and scanning electron micrographs (SEMs) made to further show the fiber structure. On the left of FIG. 7 there is shown a surface area from which the SEM surface images 8, 9 and 10 were prepared. It is seen in these SEMs that the fibers of the linking have orientation biased along their direction between pileated as was noted earlier in connection with the photomicrographs. It is further seen in FIGS. 8, 9 and 10 that the integument formed have a fiber orientation along the machine-direction. The feature is illustrated rather strikingly in FIGS. 11 and 12.

Figure 11:
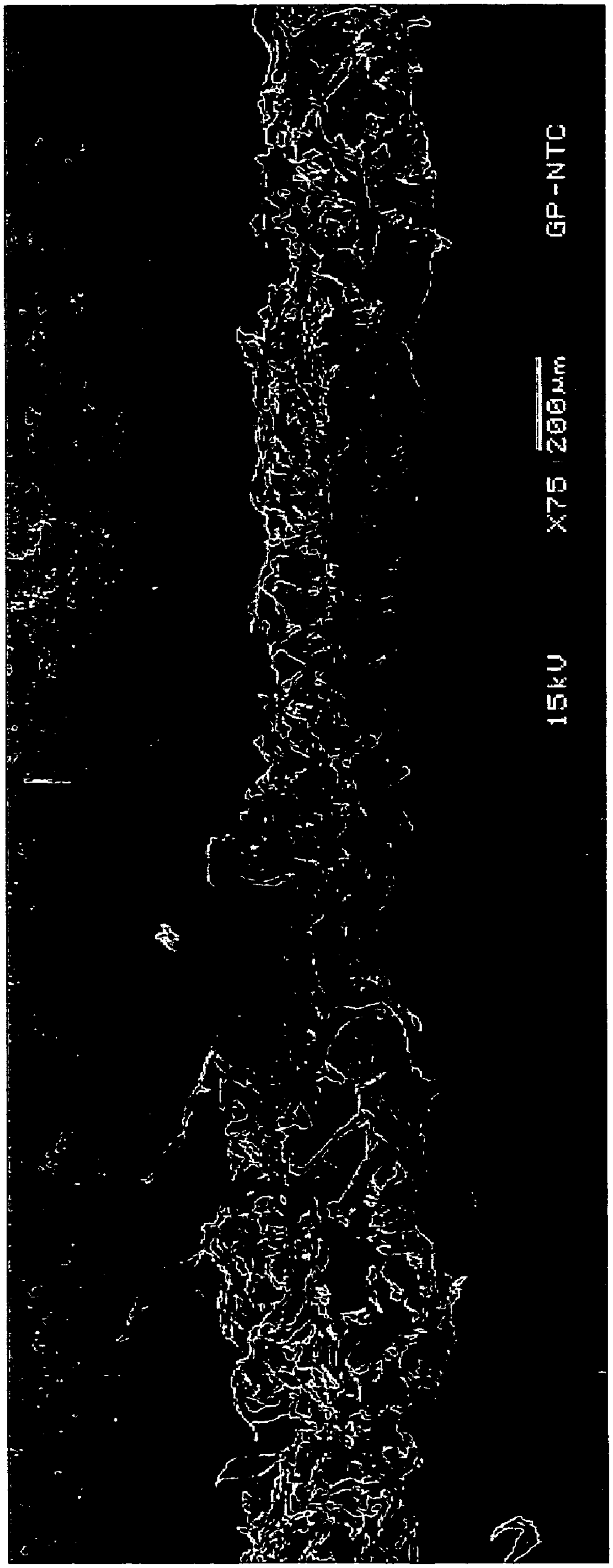
FIGS. 11 and 12 are SEMs of the sheet shown in FIG. 7 in section across the MD.
Figure 12:
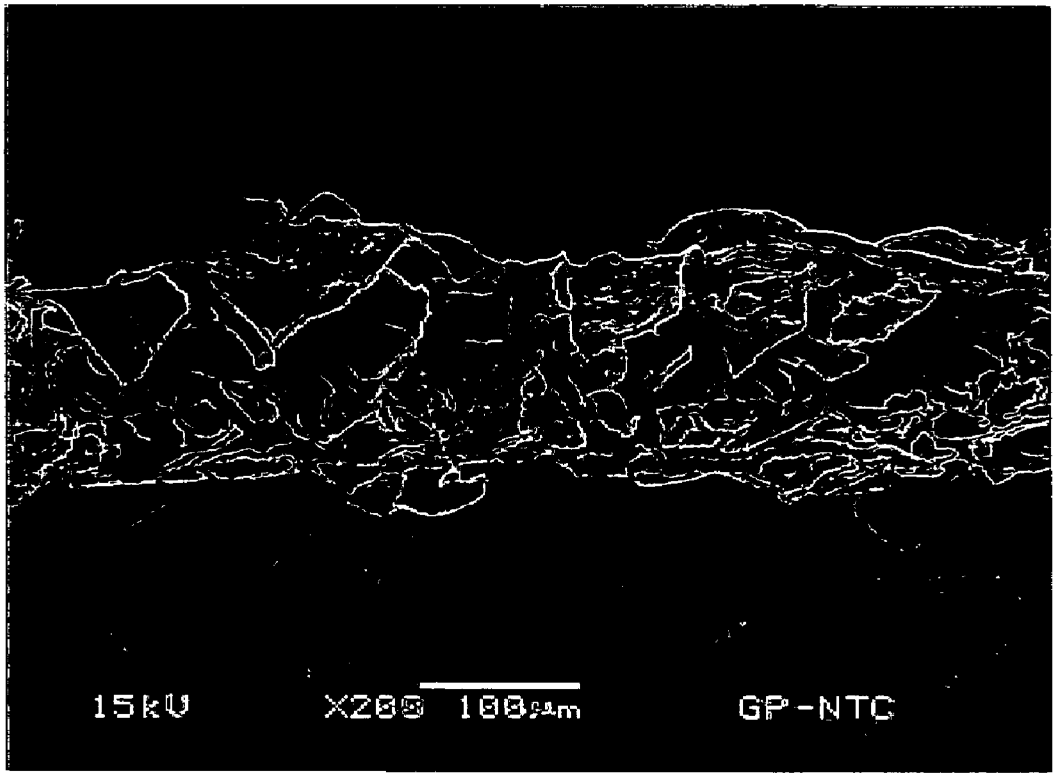

FIGS. 11 and 12 are views along line XS-A of FIG. 7, in section. It is seen especially at 200 magnification (FIG. 12) that the fibers are oriented toward the viewing plane, or machine-direction, inasmuch as the majority of the fibers were cut when the sample was sectioned.

Figure 13:
FIGS. 13 and 14 are SEMs of the sheet shown in FIG. 7 in section along the MD.
Figure 14:
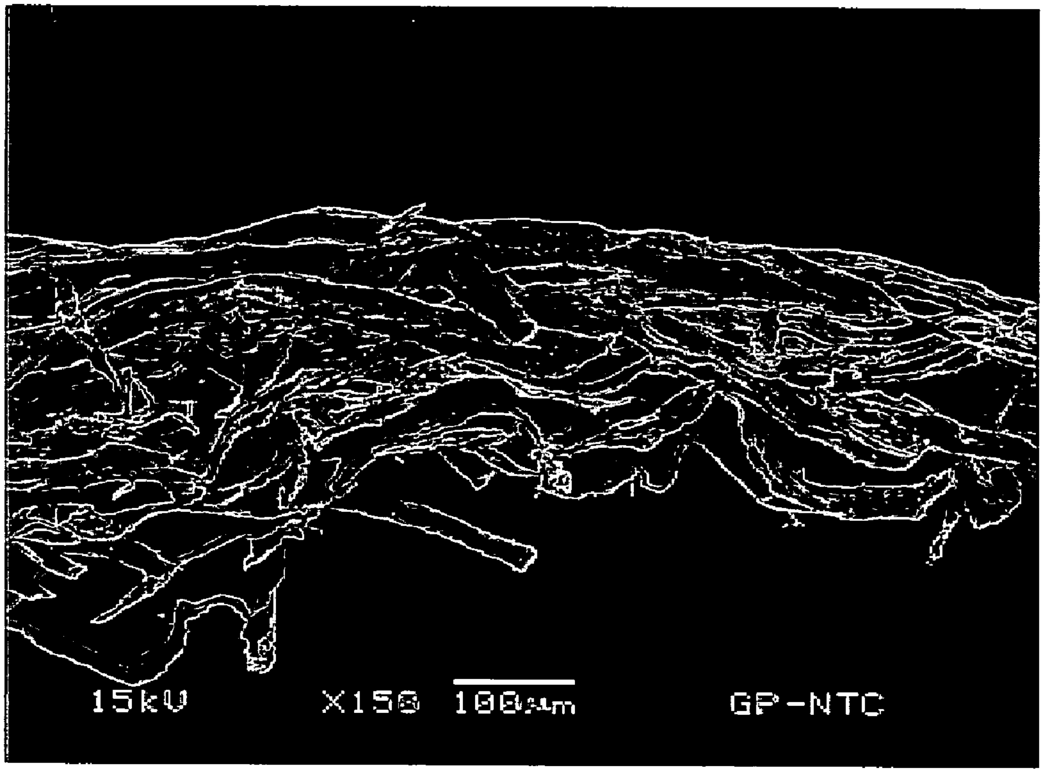

FIGS. 13 and 14, a section along line XS-B of the sample of FIG. 7, shows fewer cut fibers especially at the middle portions of the photomicrographs, again showing an MD orientation bias in these areas. Note in FIG. 13, U-shaped folds are seen in the fiber enriched area to the left. See also, FIG. 15.

Figure 15:
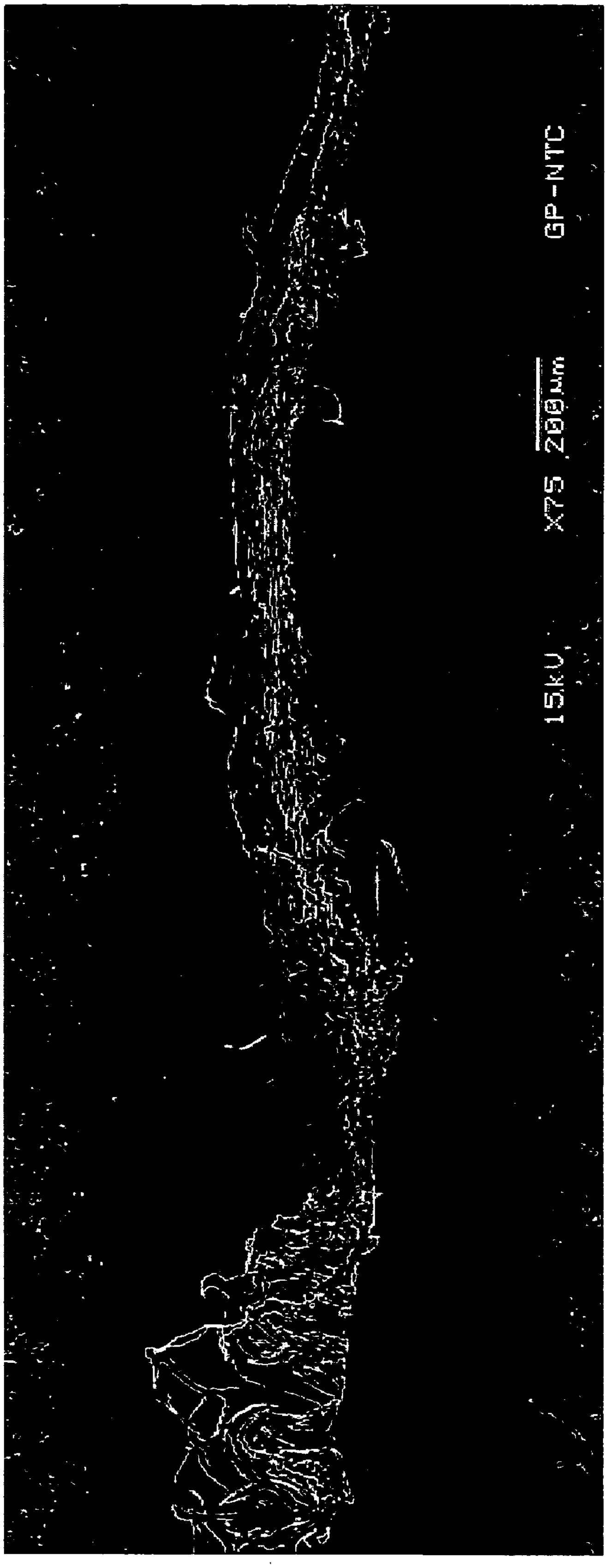
FIGS. 15 and 16 are SEMs of the sheet shown in FIG. 7 in section also along the MD.
Figure 16:
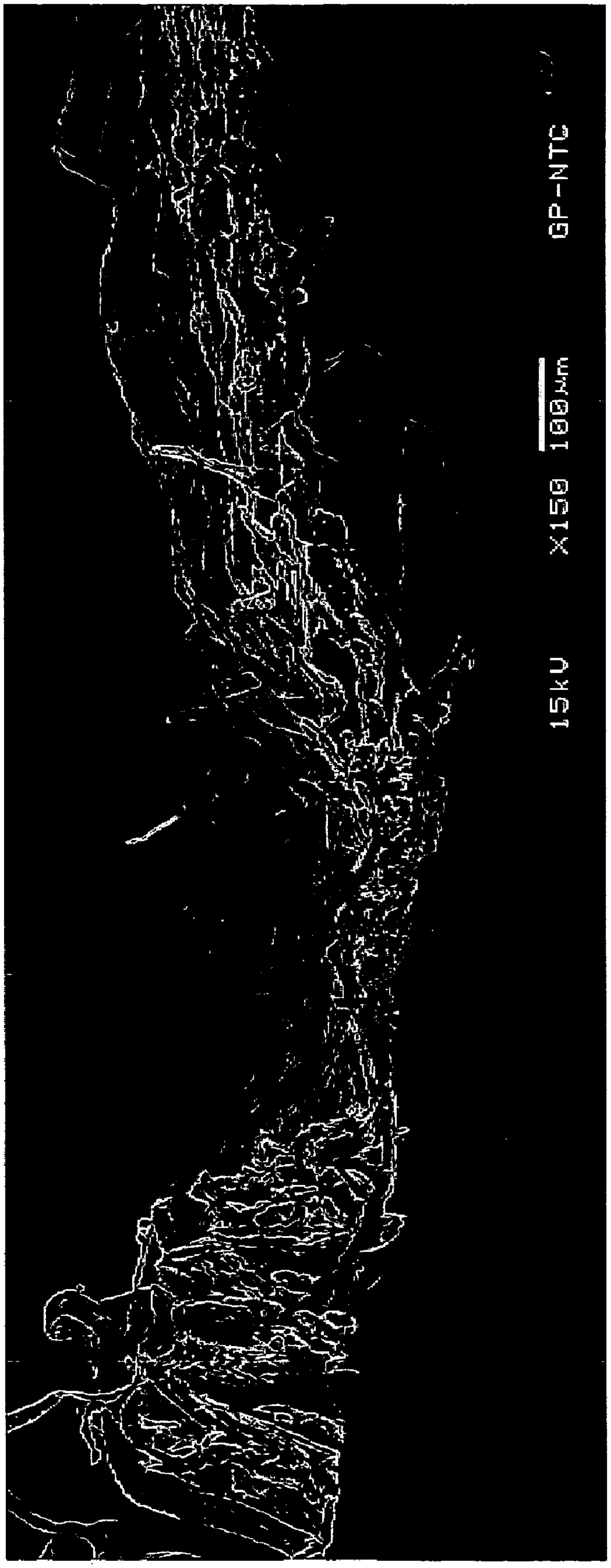

FIGS. 15 and 16 are SEMs of a section of the sample of FIG. 7 along line XS-C. It is seen in these Figures that the pileated (left side) are "stacked up" to a higher local basis weight. Moreover, it is seen in the SEM of FIG. 16 that a large number of fibers have been cut in the pileated region (left) showing reorientation of the fibers in this area in a direction transverse to the MD, in this case along the CD. Also noteworthy is that the number of fiber ends observed diminishes as one moves from left to right, indicating orientation toward the MD as one moves away from the pileated regions.

Figure 17:
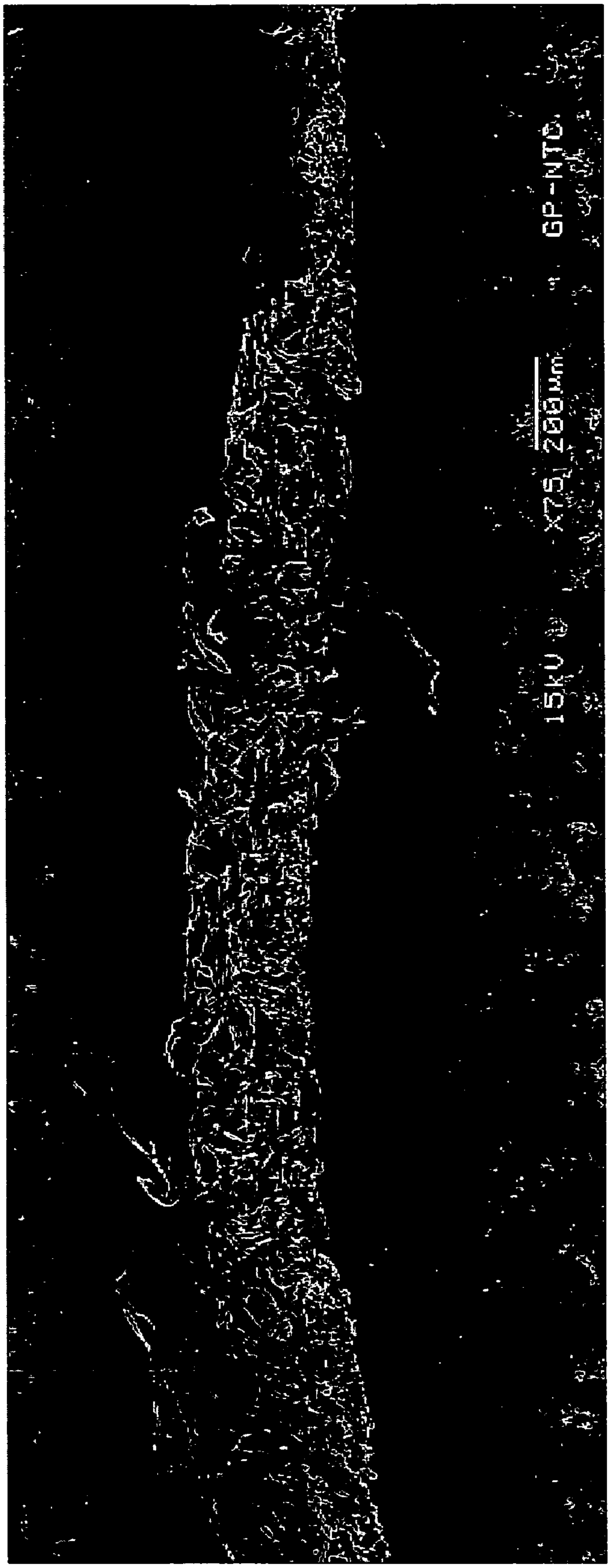
FIGS. 17 and 18 are SEMs of the sheet shown in FIG. 7 in section across the MD.
Figure 18:
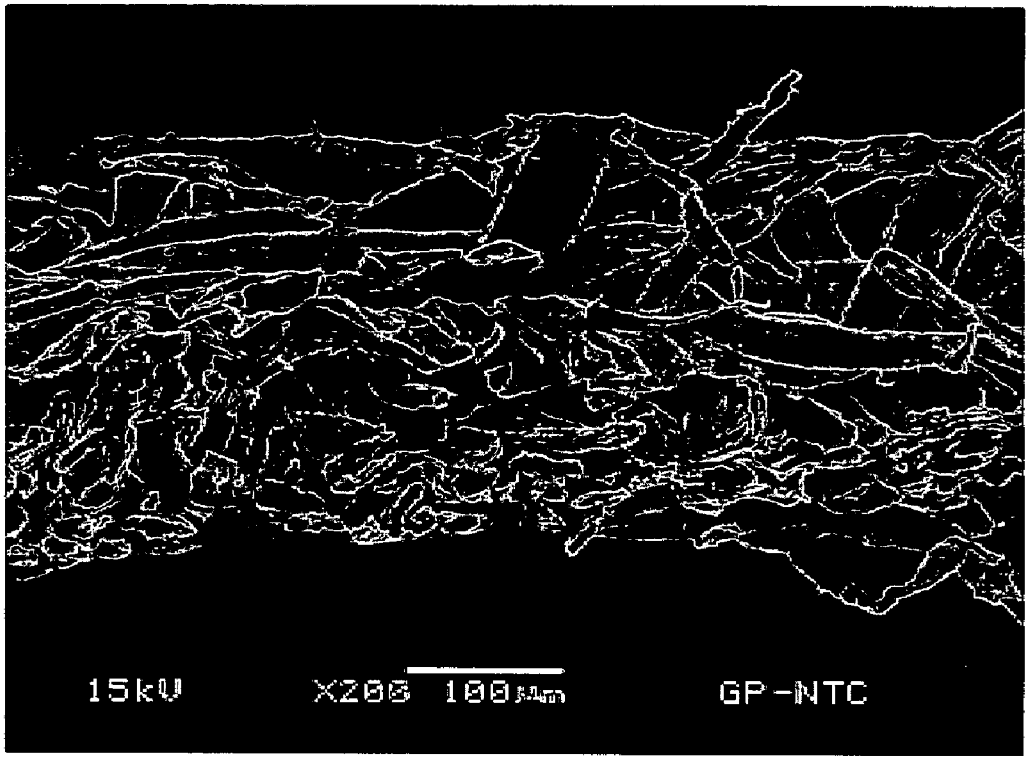

FIGS. 17 and 18 are SEMs of a section taken along line XS-D of FIG. 7. Here it is seen that fiber orientation bias changes as one moves across the CD. On the left, in a linking or colligating region, a large number of "ends" are seen indicating MD bias. In the middle, there are fewer ends as the edge of a pileated region is traversed, indicating more CD bias until another linking region is approached and cut fibers again become more plentiful, again indicating increased MD bias.

Without intending to be bound by theory, it is believed that redistribution of fiber is achieved by an appropriate selection of consistency, fabric or fabric pattern, nip parameters, and velocity delta, the difference in speed between the transfer surface and creping fabric. Velocity deltas of at least 100 fpm, 200 fpm, 500 fpm, 1000 fpm, 1500 fpm or even in excess of 2000 fpm may be needed under some conditions to achieve the desired redistribution of fiber and combination of properties as will become apparent from the discussion which follows. In many cases, velocity deltas of from about 500 fpm to about 2000 fpm will suffice.

Figure 19:
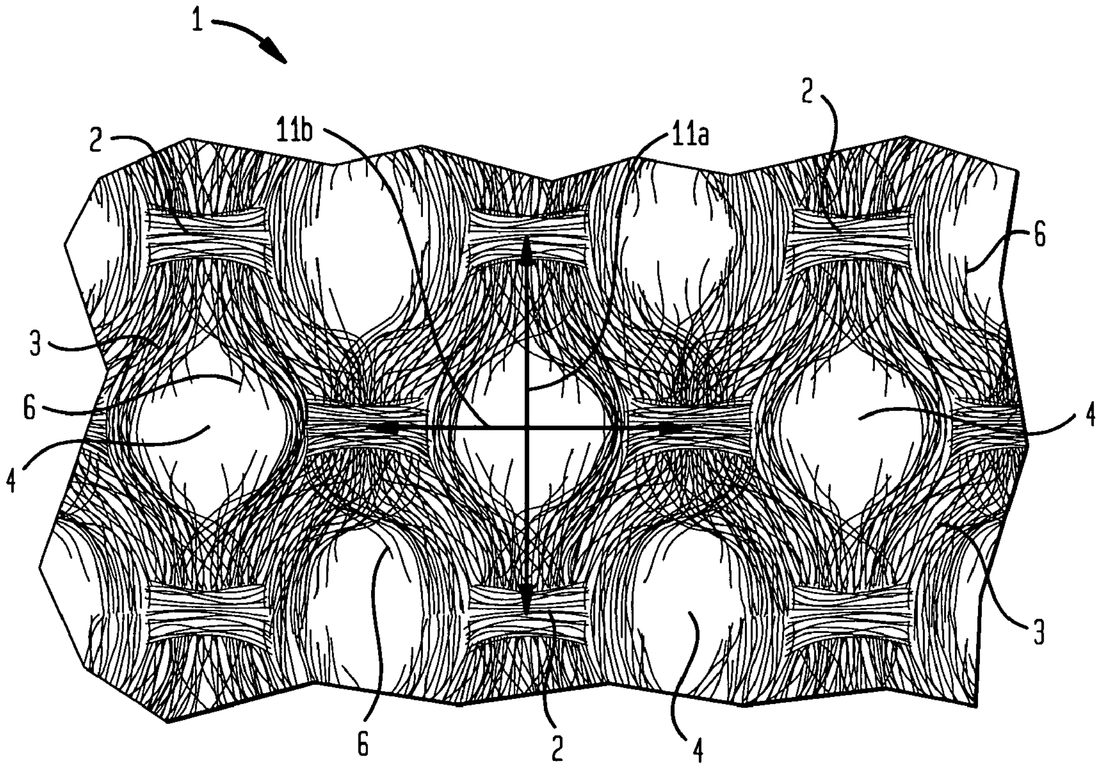
FIG. 19 is a schematic diagram illustrating the structure of the absorbent core of the multi-ply products of the present invention.

FIG. 19 is a schematic diagram of a sheet 1 having local variation in basis weight including relatively high basis weight pileated 2 interconnected with relatively low basis weight linking 3 extending therebetween. Integument 6 extend between adjacent linking and pileated and include open or void areas 4 which have no fiber at all; that is, devoid of fiber. The areas between adjacent linking and pileated are referred to as "cellules" due to their sponge-like structure and include 6 and 4. The "span" of the cellules is the average distance across the bounded by pileated 2 and linking 3 as shown at 11*a*, 11*b*. This value may be approximated by averaging the distance between CD knuckles and MD knuckles as can be appreciated from FIG. 3. On the other hand, the "span" of open or voids 4 is determined by measuring the collective open area (A) of a number of voids (N) and calculating the void span according to the formula:

$$\text{Void Span}=(4A/N\pi)^{1/2}$$

This value characterizes the void of the sheet.

Figure 20:
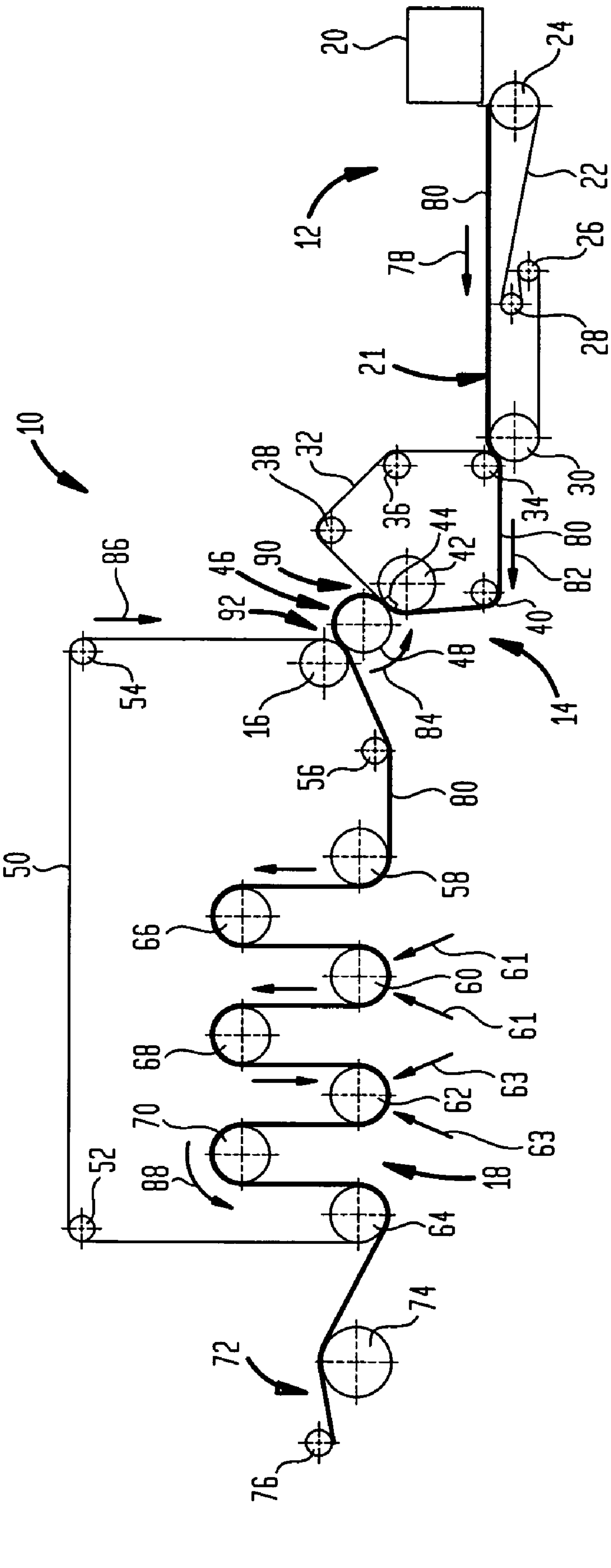
FIG. 20 is a schematic diagram of a papermachine useful for making absorbent sheet with local variation and basis weight.

Referring to FIG. 20, there is shown schematically a paper machine 10 which may be used to practice the present invention. Paper machine 10 includes a forming section 12, a press section 14, a crepe roll 16, as well as a can dryer section 18. Forming section 12 includes: a head box 20, a forming fabric or wire 22, which is supported on a plurality of rolls to provide a forming table 21. There is thus provided forming roll 24, support rolls 26, 28 as well as a transfer roll 30.

Press section 14 includes a paper making felt 32 supported on rollers 34, 36, 38, 40 and shoe press roll 42. Shoe press roll 42 includes a shoe 44 for pressing the web against transfer drum or roll 46. Transfer roll or drum 46 may be heated if so desired. In one preferred embodiment, the temperature is controlled so as to maintain a moisture profile in the web so a sided sheet is prepared, having a local variation in basis weight which does not extend to the surface of the web in contact with cylinder 46. Typically, steam is used to heat cylinder 46 as is noted in U.S. Pat. No. 6,379,496 of Edwards et al. Roll 46 includes a transfer surface 48 upon which the web is deposited during manufacture. Crepe roll 16 supports, in part, a creping fabric 50 which is also supported on a plurality of rolls 52, 54 and 56.

Dryer section 18 also includes a plurality of can dryers 58, 60, 62, 64, 66, 68, and 70 as shown in the diagram, wherein cans 66, 68 and 70 are in a first tier and cans 58, 60, 62 and 64 are in a second tier. Cans 66, 68 and 70 directly contact the web, whereas cans in the other tier contact the fabric. In this two tier arrangement where the web is separated from cans 60 and 62 by the fabric, it is sometimes advantageous to provide impingement air dryers at 60 and 62, which may be drilled cans, such that air flow is indicated schematically at 61 and 63.

There is further provided a reel section 72 which includes a guide roll 74 and a take up reel 76 shown schematically in the diagram.

Paper machine 10 is operated such that the web travels in the machine direction indicated by arrows 78, 82, 84, 86 and 88 as is seen in FIG. 20. A paper making furnish at low consistency, less than 5%, is deposited on fabric or wire 22 to form a web 80 on table 21 as is shown in the diagram. Web 80 is conveyed in the machine direction to press section 14 and transferred onto a press felt 32. In this connection, the web is typically dewatered to a consistency of between about 10 and 15 percent on wire 22 before being transferred to the felt. So also, roll 34 may be a vacuum roll to assist in transfer to the felt 32. On felt 32, web 80 is dewatered to a consistency typically of from about 20 to about 25 percent prior to entering a press nip indicated at 90. At nip 90 the web is pressed onto cylinder 46 by way of shoe press roll 42. In this connection, the shoe 44 exerts pressure where upon the web is transferred to surface 48 of roll 46 at a consistency of from about 40 to 50 percent on the transfer roll. Transfer roll 46 translates in the machine direction indicated by 84 at a first speed.

Fabric 50 travels in the direction indicated by arrow 86 and picks up web 80 in the creping nip indicated at 92. Fabric 50 is traveling at second speed slower than the first speed of the transfer surface 48 of roll 46. Thus, the web is provided with a Fabric Crepe typically in an amount of from about 10 to about 100 percent in the machine direction.

The creping fabric defines a creping nip over the distance in which creping fabric 50 is adapted to contact surface 48 of roll 46; that is, applies significant pressure to the web against the transfer cylinder. To this end, backing (or creping) roll 16 may be provided with a soft deformable surface which will increase the length of the creping nip and increase the fabric creping angle between the fabric and the sheet and the point of contact or a shoe press roll could be used as roll 16 to increase effective contact with the web in high impact fabric creping nip 92 where web 80 is transferred to fabric 50 and advanced in the machine-direction. By using different equipment at the creping nip, it is possible to adjust the fabric creping angle or the takeaway angle from the creping nip. A cover on roll 16 having a Pusey and Jones hardness of from about 25 to about 90 may be used. Thus, it is possible to influence the nature and amount of redistribution of fiber, delamination/debonding which may occur at fabric creping nip 92 by adjusting these nip parameters. In some embodiments it may by desirable to restructure the z-direction interfiber characteristics while in other cases it may be desired to influence properties only in the plane of the web. The creping nip parameters can influence the distribution of fiber in the web in a variety of directions, including inducing changes in the z-direction as well as the MD and CD. In any case, the transfer from the transfer cylinder to the creping fabric is high impact in that the fabric is traveling slower than the web and a significant velocity change occurs. Typically, the web is creped anywhere from 10-60 percent and even higher during transfer from the transfer cylinder to the fabric.

Creping nip 92 generally extends over a fabric creping nip distance of anywhere from about ⅛" to about 2", typically ½" to 2". For a creping fabric with 32 CD strands per inch, web 80 thus will encounter anywhere from about 4 to 64 weft filaments in the nip.

The nip pressure in nip 92, that is, the loading between backing roll 16 and transfer roll 46 is suitably 20-100, preferably 40-70 pounds per linear inch (PLI).

Following the Fabric Crepe, web 80 is retained in fabric 50 and fed to dryer section 18. In dryer section 18 the web is dried to a consistency of from about 92 to 98 percent before being wound up on reel 76. Note that there is provided in the drying section a plurality of heated drying rolls 66, 68 and 70 which are in direct contact with the web on fabric 50. The drying cans or rolls 66, 68, and 70 are steam heated to an elevated temperature operative to dry the web. Rolls 58, 60, 62 and 64 are likewise heated although these rolls contact the fabric directly and not the web directly.

In some embodiments of the invention, it is desirable to eliminate open draws in the process, such as the open draw between the creping and drying fabric and reel 76. This is readily accomplished by extending the creping fabric to the reel drum and transferring the web directly from the fabric to the reel as is disclosed generally in U.S. Pat. No. 5,593,545 to Rugowski et al.

Figure 21:
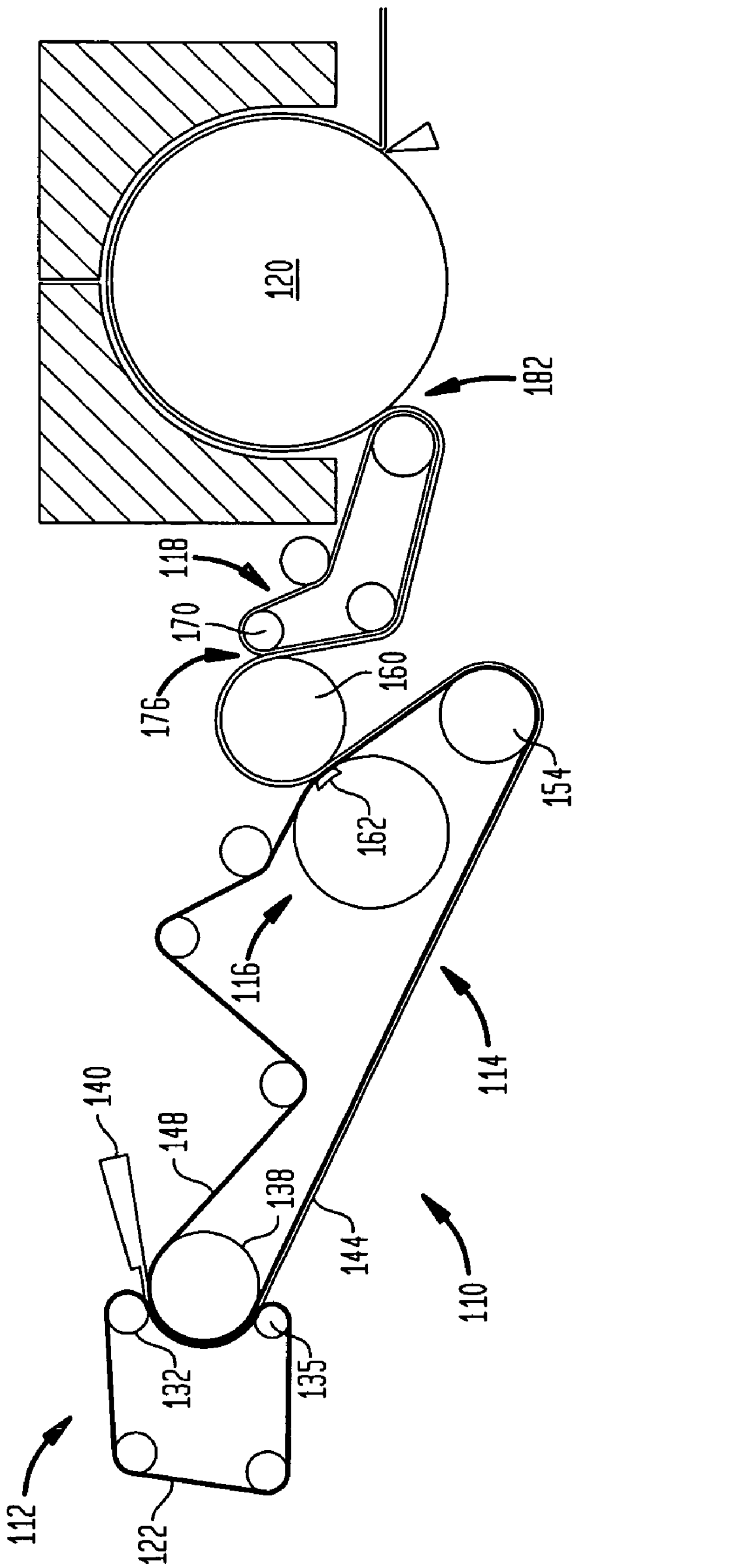
FIG. 21 is a schematic diagram of another papermachine useful for making absorbent sheet with local variation and basis weight.

There is shown in FIG. 21 another papermachine 110 for use in connection with the present invention. Papermachine 110 is a three fabric loop machine having a forming section 112 generally referred to in the art as a crescent former. Forming section 112 includes a forming wire 122 supported by a plurality of rolls such as rolls 132, 135. The forming section also includes a forming roll 138 which supports paper making felt 148 such that web 144 is formed directly on felt 148. Felt run 114 extends to a shoe press section 116 wherein the moist web is deposited on a backing roll 160 and wet-pressed concurrently with the transfer. Thereafter web 144 is creped onto fabric 118 in fabric crepe nip 176 before being deposited on Yankee dryer 120 in another press nip 182 using a creping adhesive as noted above. The system includes a vacuum turning roll 154, in some embodiments; however, the three loop system may be configured in a variety of ways wherein a turning roll is not necessary. This feature is particularly important in connection with the rebuild of a papermachine inasmuch as the expense of relocating associated equipment i.e. pulping or fiber processing equipment and/or the large and expensive drying equipment such as the Yankee dryer or plurality of can dryers would make a rebuild prohibitively expensive unless the improvements could be configured to be compatible with the existing facility.

In order to produce the inventive multi-ply products of the invention, sheet having a local variation in basis weight as shown in FIGS. 1-19 is produced on a papermachine as described in connection with FIGS. 20, 21. A sided sheet may be plied with another sided sheet with outer continuous surfaces or a sheet with local variation in basis weight may be incorporated as the core of a three-ply structure.

Figure 22:
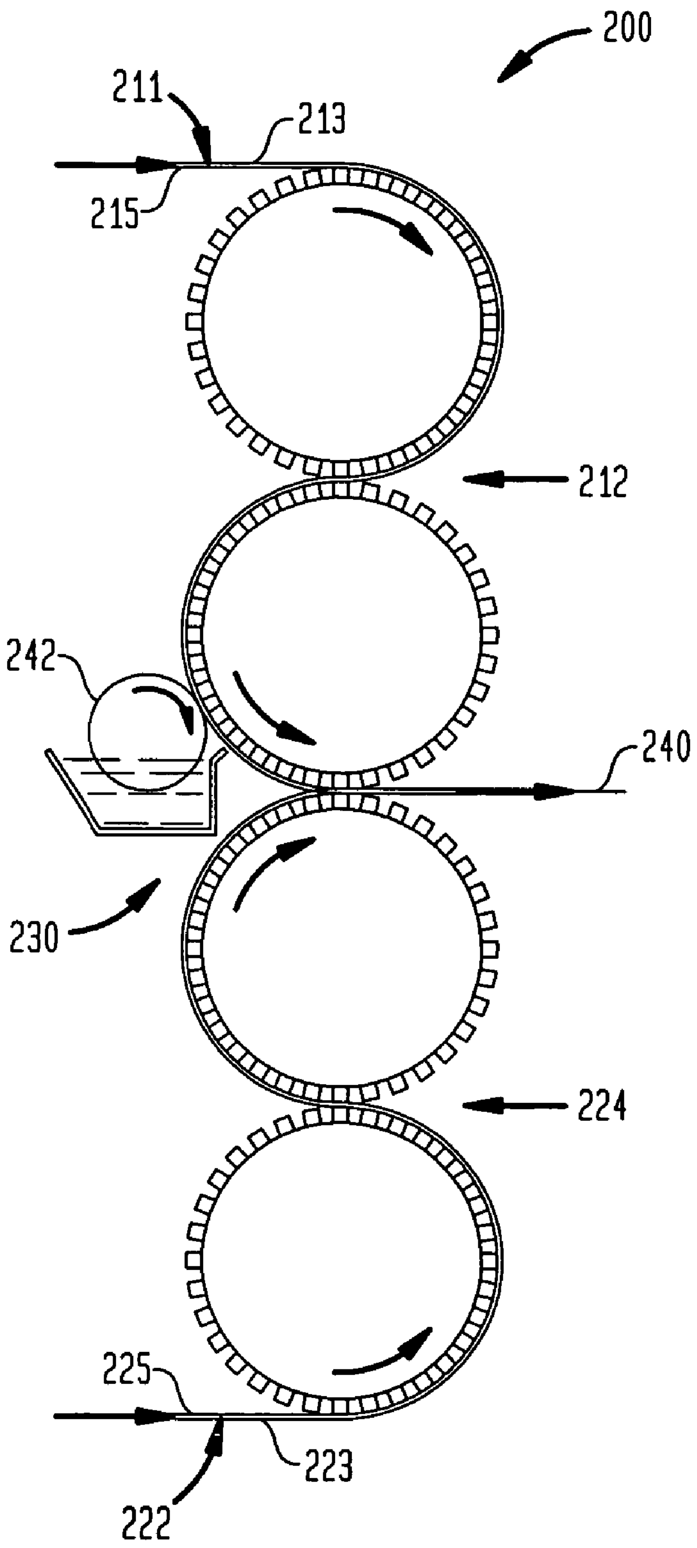
FIG. 22 is a schematic diagram illustrating embossing and plying of a two-ply product of the present invention.

Referring to FIG. 22, there is shown an embossing and plying apparatus 200 wherein a first sided ply 211 is embossed by a first matched pair of rolls 212. Ply 211 has an outer continuous surface 213 as well as an internal surface 215 having fiber-deprived as noted above. A second ply 223 is embossed by rolls at 224. Ply 222 also has a continuous outer surface 223 and in internal surface 225 with fiber-deprived regions. The two plies are fed to plying nip 230 and plied to form a two-ply structure 240 wherein their sides having fiber-deprived are in contact with each other in the interior of the sheet and continuous surfaces 213, 223 form the outer surfaces of the multi-ply absorbent structure. Optionally, an adhesive is applied to sheet 211 by way of a rotogravure roll indicated at 242 to secure the sheets to one another; in many cases matched elements in nip 230 suffice for purposes of securing the sheets.

Figure 23:
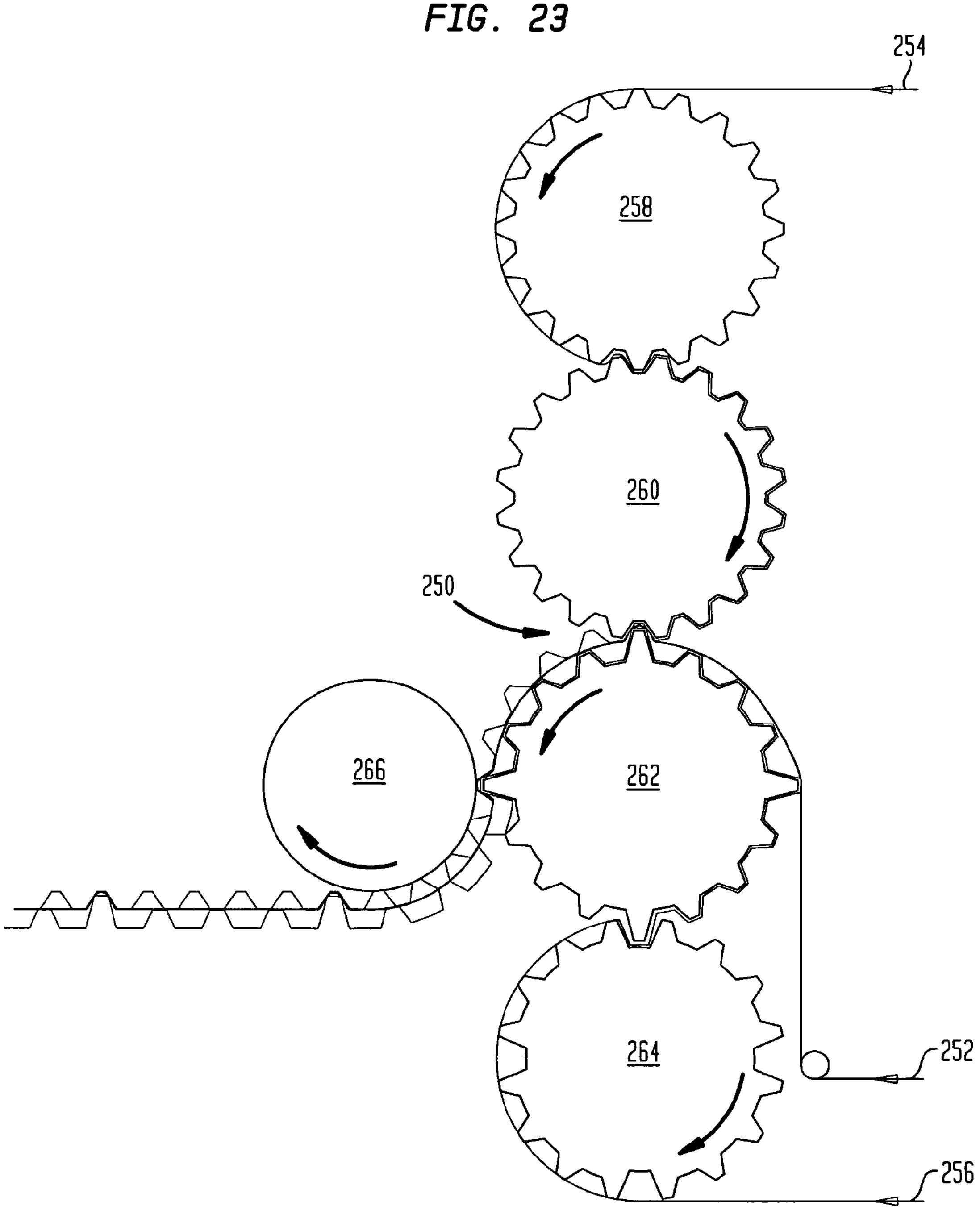
FIG. 23 is a schematic diagram illustrating embossing and plying of a three-ply product of the present invention.

The inventive multi-ply structures are also conveniently produced as three-ply structures as shown substantially in FIG. 23. In FIG. 23, there is shown a plying station 250 wherein a central ply 252 having local variation basis weight is plied with outer plies 254, 256. Central ply 252, the core of the absorbent structure, may have open-mesh areas as seen in FIG. 1, or may have continuous surfaces is so desired. Plies 254, 256 may have local variations in basis weight if so desired, or may be conventional absorbent sheet. The outer surfaces of plies 254, 256 are continuous surfaces.

The embossing station of FIG. 23 includes rolls 258, 260, 262, 264 and 266 which rotate in directions indicated by the arrows and are configured and positioned so that they cooperate to secure the sheets to each other. Here again, adhesive is optionally used and it will be appreciated that any suitable plying protocol may be employed.

The inventive products may also be provided with a laterally hydrophobic surface as described in co-pending U.S. application Ser. No. 10/702,414, filed Nov. 6, 2003, entitled "Absorbent Sheet Exhibiting Resistance to Moisture Penetration" as further noted below.

At least one surface of cellulosic fibers is rendered resistant to moisture penetration while generally retaining its absorbency. In preferred embodiments the treated webs exhibit physical properties such as air permeability and wet tensile strength similar to, or the same as, a like untreated product. A web treated with a few weight percent wax and emulsifier is capable of exhibiting a contact angle with water almost the same as the wax for a limited time and thus controls the migration of fluid in the web much more so than one would expect given the relatively small amount of wax present. That is, a small amount of wax can increase the contact angle with water of a cellulosic web, typically 0 degrees, to an initial contact angle value comparable to wax at about 90 degrees while the absorbency of the web is maintained. An aqueous wax/emulsifier composition applied to the web does not exhibit the desired barrier properties described herein until the residue is heated above its melting point in situ with the web. Without intending to be bound by any theory, it is believed that the emulsifier operates as a dispersing aid for the wax and cooperates with the fiber surfaces to disseminate the wax in the web such that the wax has no independent macrostructure and the wax associates with a great deal of fiber surface area at a hydrophobic surface of the treated web. A typical process for treating a web in accordance with the invention involves wetting at least one surface of the web with an aqueous dispersion including a wax and an emulsifier and heating the web above the melting point of the wax to fuse the wax of the dispersion and to provide a hydrophobic surface on the web. The hydrophobic surface is much more hydrophobic than the web of cellulosic fibers and generally exhibits a contact angle with water at one minute of 50 degrees or more.

In order to measure the moisture penetration delay of a surface of absorbent sheet, single or multi-ply, a sample is conditioned at 23° C. and 50% relative humidity. The conditioned sample is secured lightly in a frame without substantial stretching in either the machine or cross-direction, but with sufficient tension in all directions such that the sheet is smooth. The sheet is suspended in the frame horizontally such that both surfaces of the sheet are not in contact with any other surface, that is, in contact with air only, since a surface in contact with the sheet can significantly influence moisture penetration delay times. The surface to be characterized is oriented upwardly and a 0.10 ml droplet of colored water is placed gently thereon. A timer is started simultaneously with the placement of the colored water droplet on the surface and stopped when the droplet is completely absorbed into the sheet and no longer projects upwardly from the surface as observed visually with the naked eye. The time is recorded as the moisture penetration delay. Testing is conducted at room temperature.

Figure 24A:
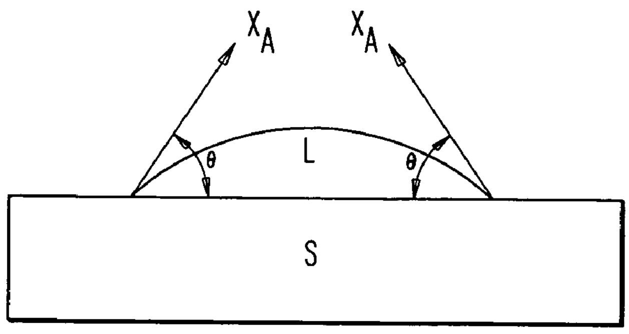
FIG. 24A is a schematic diagram illustrating the contact angle of a water droplet with a surface.
Figure 24B:
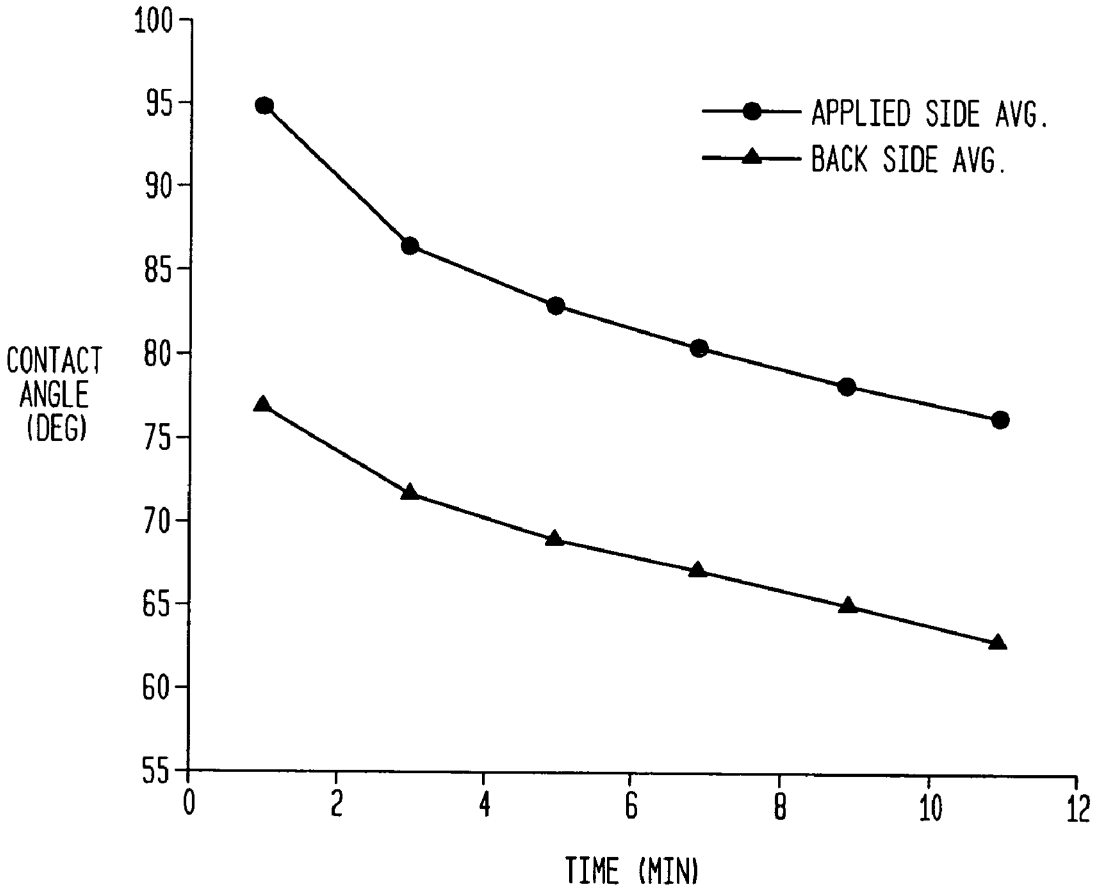
FIGS. 24B, 24C and 24D are graphical representations of contact angle data of an absorbent sheet provided with a fused wax composition on one surface thereof.
Figure 24C:
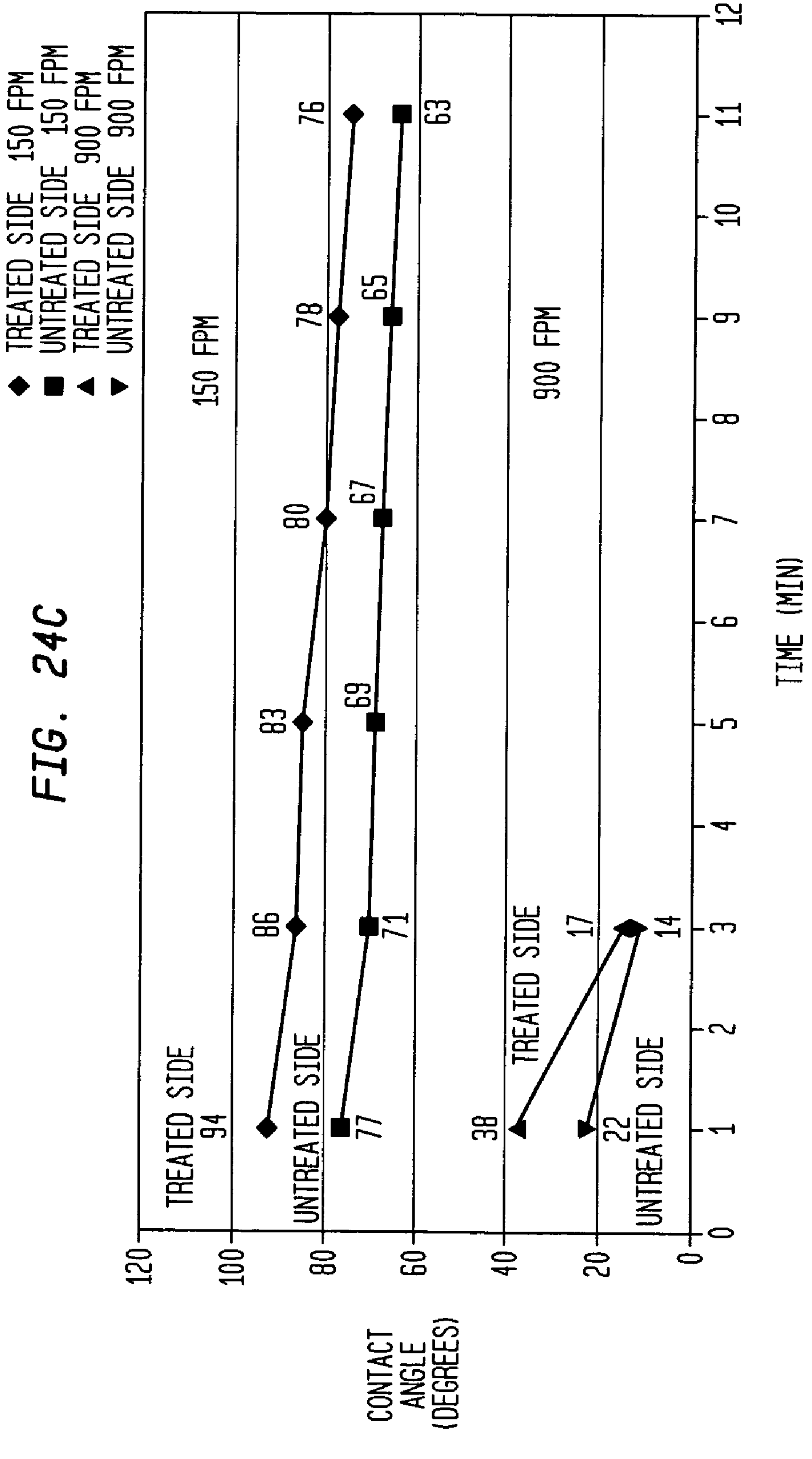

The angle defined between a tangent to a liquid droplet surface at its air/liquid interface at the droplet's line of contact with a solid and the solid substrate surface upon which the droplet rests (as measured through the liquid) is generally referred to as the contact angle of a liquid with a solid. See FIG. 24A. The contact angle may be measured at any point at the line of contact of the three phases, air/liquid/solid. "Contact angles" herein refer to contact angles of the absorbent sheet with water at room temperature as measured with a goniometer. While it was found that wax-treated sheet exhibited contact angles which varied somewhat over time, the differences between contact angles between a treated surface and the opposite (untreated) surface thereof remains relatively constant as is seen in FIGS. 24B and 24C. Moreover, since the contact angle of an untreated cellulosic sheet is 0 degrees, the absolute increase in contact angle is a reliable quantification of the inventive products. Contact angles are determined by adhering the sample to a 75×25 mm glass microscope slide. A slide is prepared to receive the sample with a strip of double-sided adhesive tape. A sample ply, typically a basesheet, is adhered to the tape with the surface to be tested oriented upwardly. The slide is then placed on the goniometer sample stage and a 0.01 ml drop of distilled water is placed on the surface to be tested. The time is started simultaneously with placing the droplet on the sample surface and the image of the droplet/sheet sample interface is captured at 1, 3, 5, 7, 9 and 11 minutes by the goniometer using a telescopic lens arrangement and video signal recorder. The video signals are analyzed for contact angle by drawing a tangent vector from the line of contact between the water droplet and the sheet surface as illustrated in FIG. 24A. Any suitable goniometer may be employed. One suitable apparatus is a goniometer available from Rame-Hart Inc., which is operated with Panasonic camera WV-BP312 and used Java based software to measure the contact angle.

The wax used includes relatively low melting organic mixtures or compounds of relatively high molecular weight, solid at room temperature and generally similar in composition to fats and oils except that they contain little or no glycerides. Some waxes are hydrocarbons, others are esters of fatty acids and alcohols. Waxes are thermoplastic, but since they are not high polymers, are not considered in the family of plastics. Common properties include smooth texture, low toxicity, and freedom from objectionable odor and color. Waxes are typically combustible and have good dielectric properties. They are soluble in most organic solvents and insoluble in water. Typical classes of waxes are enumerated briefly below.

Natural waxes include carnauba waxes, paraffin waxes, montan waxes, and microcrystalline waxes. Carnauba is a natural vegetable wax derived from fronds of Brazilian palm trees (*Copernica cerifera*). Carnauba is a relatively hard, brittle wax whose main attributes are lubricity, anti-blocking and FDA compliance. Carnauba is popular in the can and coil coating industry as well as the film coating industry. The melting point of carnauba waxes is generally from about 80 to about 86° C.

Paraffins are low molecular weight waxes with melting points ranging from about 48° to about 74° C. They are relatively highly refined, have a low oil content and are straight-chain hydrocarbons. Paraffins provide anti-blocking, slip, water resistance and moisture vapor transmission resistance.

Montan waxes are mineral waxes which, in crude form, are extracted from lignite formed decomposition of vegetable substances. Typical melting point for montan wax range from about 80 to about 90° C.

Microcrystalline waxes come from the distillation of crude oil. Microcrystalline waxes have a molecular weight of from about 500 to 675 grams/mole and melting points of about 73° C. to about 94° C. These waxes are highly branched and have small crystals.

Synthetic waxes include Fischer-Tropsch waxes, polyethylene waxes and wax dispersions of various macromers. Fischer-Tropsch waxes are produced almost exclusively in South Africa by coal gasification. They include methylene groups which can have either even or odd numbers of carbons. These waxes have molecular weights of 300-1400 gms/mole and are used in various applications.

Polyethylene waxes are made from ethylene produced from natural gas or by cracking petroleum naptha. Ethylene is then polymerized to provide waxes with various melting points, hardnesses, and densities. Polyethylene wax molecular weights range from about 500-3000 gms/mole. Oxidized polyethylenes are readily emulsifiable whereas non-oxidized polyethylenes largely are not. However, some non-oxidized polyethylenes have been successfully emulsified. High density polyethylenes (HDPE) have a great deal of crystallinity and their molecules are tightly packed. Melting points range from about 85° C. to about 141° C. and they are used in paints, textiles, coatings and polishes. Low density polyethylenes display more toughness and exhibit better crystal formation. Densities are from about 0.9 to about 0.95 gms/ml, and melting points range from 3° C. to 141° C.

Wax dispersions are well known in the art. It is preferred in accordance to the present invention to employ water-borne wax dispersions as are particularly well known in the art. In this respect there is noted in U.S. Pat. No. 6,033,736 to Perlman et al.; U.S. Pat. No. 5,431,840 to Soldanski et al., as well as U.S. Pat. No. 4,468,254 to Yokoyama et al., the disclosure of which patents is incorporated herein by reference. In general a wax dispersion includes from about 90 to about 50 percent water, from about 10 to about 50 percent wax solids, and minor amounts of an emulsifier. "Aqueous wax dispersion" and like terminology refers to a stable mixture of wax, emulsifier and water without a substantial solvent component. The wax is in solid or unmelted form at room temperature and the wax dispersion is typically wetted onto the sheet under ambient or near ambient conditions. The particle size of the dispersion may be greater than or less than 1 micron, with average particle sizes of from about 100 nm to about 500 nm being typical for use in connection with the present invention. Typically, the dispersions are from 20-50 weight percent solids.

Preferred Treatments

It has been found that wax dispersions such as polyethylene wax dispersions, polypropylene wax dispersions, polybutene dispersions, polyurethane wax dispersions, polycrystalline wax dispersions, carnauba wax dispersions, and carnauba wax blend dispersions, can be used to create a barrier for tissue and towel products while not impairing their absorbency or adversely affecting their look and feel. The treated surface surprisingly has a better hand feel perception and becomes more hydrophobic than a non-treated sample. Sheets or webs may be treated by spraying a wax dispersion containing 20-40 percent solids onto the web in an amount of from about 3-5 percent or so followed by heating the web in an oven for 5 minutes at 100° C. when the wax has a melting temperature of less than 100° C.

In some embodiments, the fibers under the treated surface appear to be more hydrophilic than the non-treated sample. Without intending to be bound by any theory, these properties may be due to the micelle structure breaking during contact with the fiber. During this process the wax may first be disposed on the web surface and the emulsifier (hydrophilic material) component of the dispersion may then migrate further into the web to improve the fiber wettability. This interaction of a fused wax dispersion with the fiber surface offers a significant advantage for creating a water barrier without adversely affecting the softness and absorbency of the product.

It was also discovered that the water barrier properties of treated samples is not affected by the location of the treated surface in the web structure. The treated surface could be located either outside in contact with the wiping surface or inside of the web structure, as well as throughout a ply. In the cases where the treated surface is outside, the water barrier functions to reduce the wetted area (i.e., reduce xy or lateral water spreading and promote z direction migration). A lower wet web surface area is another advantage of the invention as it reduces the discomfort feeling of a consumer in the case when the product is contacted to the skin for long period such as is the case with diapers, and other personal hygiene products.

Figure 25:
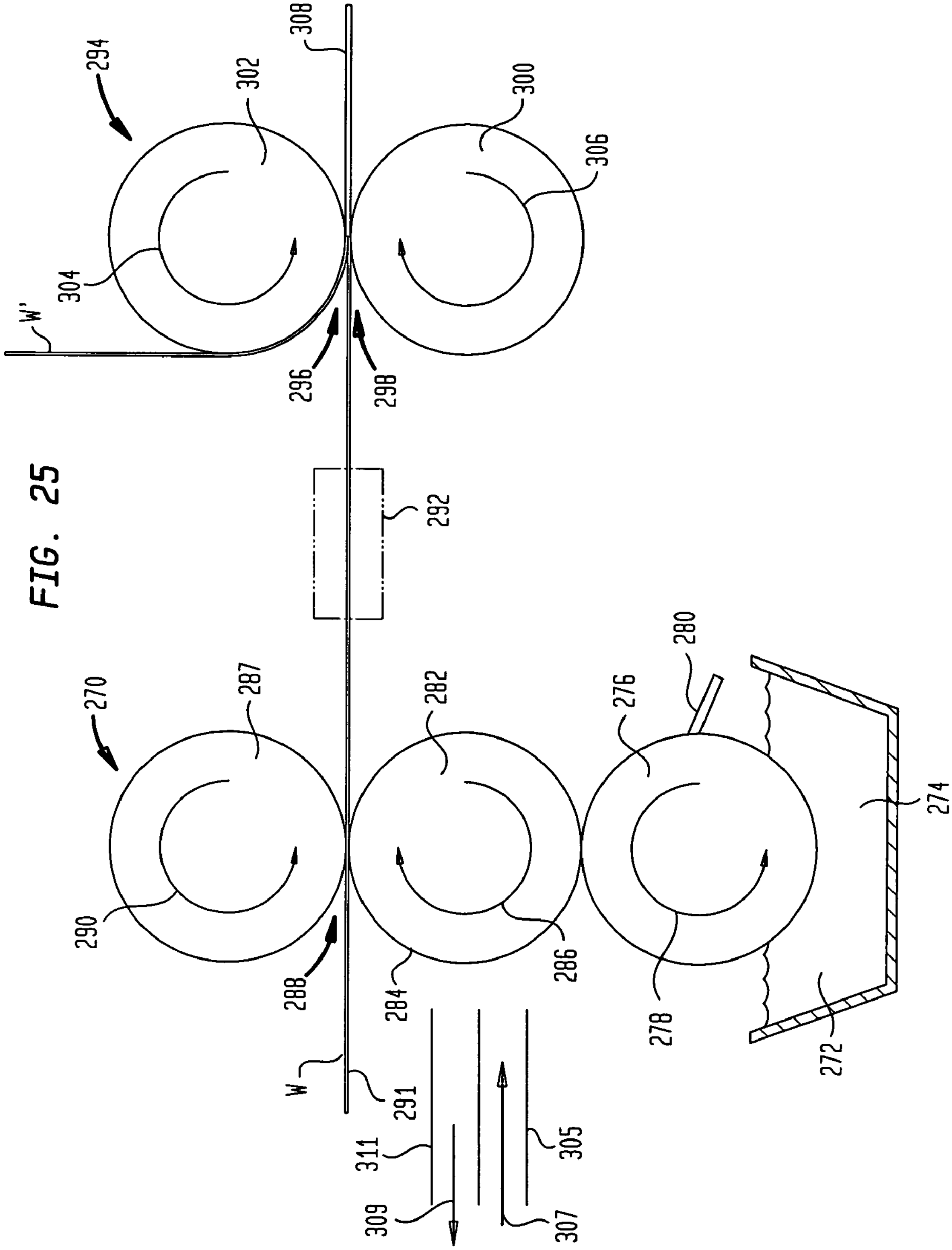
FIG. 25 illustrates the manufacture of a two-ply product of the invention provided with a wax-treated surface.

As an alternative to spraying the aqueous wax dispersion onto a basesheet or web W during its manufacture, one may obtain greater uniformity in the coating and accurate loadings by printing the wax onto the absorbent sheet followed by heating the web in an oven at temperatures sufficient to fuse the wax. Typically, it is desirable to distribute the aqueous dispersion uniformly at the surface (as opposed to distributing the dispersion in a pattern) by way of offset printing as shown schematically in FIG. 25 with a smooth applicator roll. There is shown in FIG. 25 a printing station 270 provided with a reservoir 272 of a suitable wax dispersion 274. A feed roller 276 is partially immersed in reservoir 272 and rotates in the direction indicated by arrow 278. Feed roller 276 may be provided with a roughened surface or engraved (e.g., a gravure roller) to pick up additional fluid as it rotates through reservoir 272. There is optionally provided a doctor blade 280 to remove excess dispersion form the roller. Blade 280 may or may not contact feed roller 276, depending on the amount of dispersion desired to be transferred to as an applicator roll 282, and the nature of the surface of the feed roll.

Applicator roll 282 has a smooth, resilient surface 284 which contacts feed roll 276 as shown. Surface 284 receives the dispersion as it rotates in the direction indicated by arrow 286 and prints it onto a web W of absorbent sheet as the sheet travels between applicator roll 282 and a backing roll 287 in the direction indicated by arrow 288 while roll 287 rotates in direction 290. The dispersion is printed onto surface 291 of web W in any suitable amount; typically in an amount such that the web is provided with about 1 to about 20 percent wax based on the amount of wax and cellulosic fiber in the sheet and then fused in an oven indicated at 292. The emulsifier is likewise present in the sheet, but typically in much smaller amounts since the emulsifier is generally present in amounts of less than 5 percent of the total solids in the dispersion.

There is optionally provided a conduit 305 for providing heated air indicated by arrow 307 to the surface of applicator roll 282 and on exhaust conduit 311 acting as a return in a flow direction indicated by arrow 309. The dispersion to be printed on the sheet is raised in solids at this point by using heated air to remove excess water. This water cannot be removed prior in the process because viscosities become too high. However at this point, as long as the material can be transferred to the web, water can be removed irrespective of the viscosity rise. In some cases, a "skin" may form over the material from the rapid drying and the base material may even "melt" or begin to melt which will permit even higher water removal while "sealing" the web so that the remaining water and desired material do not migrate into the sheet. Therefore less material need be applied to achieve desired effects. Likewise, heat can be provided to applicator roll 282 by any suitable means including electric coils, hot oil, steam and so forth in order to achieve the desired results.

Web W may be plied with another web W' at a calendar or embossing station 294 as web W advances along the direction indicated generally by arrow 296. Web W and web W' are bonded together in a nip 298 by light pressure between a pair of rolls 300, 302 which rotate in directions 304 and 306, respectively, to make a 2-ply napkin product, for example, as shown at 308. There is preferably provided an adhesive or glue between the plies to promote bonding between fibers of the plies. Alternatively, basesheet may be plied and then wax-treated.

Figure 24D:
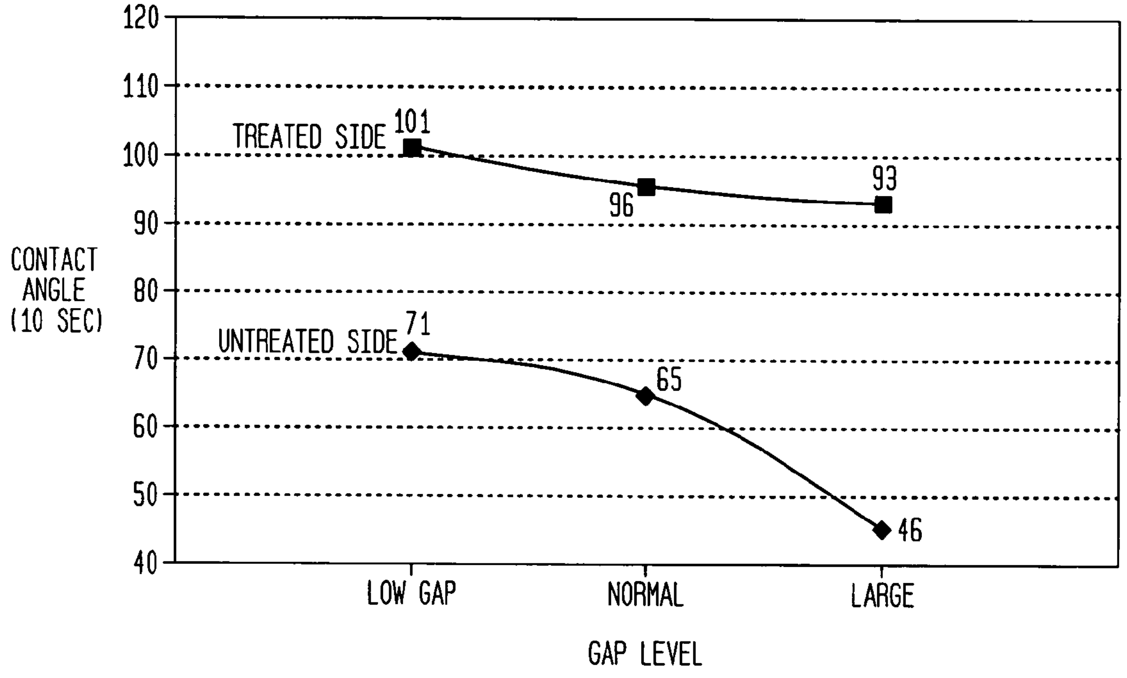

To demonstrate the effect of the fused wax dispersion on the hydrophobicity of the sheet, basesheet was prepared as described above treated on one side with 6.2% by weight (dry basis) with MICHEM® wax dispersion 48040M2. The contact angle over time for five samples on the treated side (side A) and the untreated side (side B) were measured using the procedure noted hereinabove. The contact angle is thus defined at the line of contact between the air (A), liquid droplet (L) and basesheet (S) as is seen in FIG. 24A, where the contact angle (θ) is shown between the surface (S) and the tangent vector $X_A$ at the air side of the droplet. While values of θ varied somewhat over time, the differences between contact angles of opposite sides of the sheet remained relatively constant. Speed and gap were also varied. Results appear in FIGS. 24B, 24C and 24D for different process conditions.

While the invention has been described in connection with several examples, modifications to those examples within the spirit and scope of the invention will be readily apparent to those of skill in the art. In view of the foregoing discussion, relevant knowledge in the art, co-pending applications and references discussed above in connection with the Background and Detailed Description, the disclosures of which are all incorporated herein by reference, further description is deemed unnecessary.

What is claimed is:

1. A multi-ply absorbent sheet of cellulosic fiber provided with continuous outer surfaces and an absorbent core between the outer surfaces, the absorbent core including a non-woven fiber network comprising: (i) a plurality of pileated fiber enriched of relatively high local basis weight interconnected by way of (ii) a plurality of lower local basis weight linking whose fiber orientation is biased along the direction between pileated interconnected thereby, and (iii) a plurality of fiber-deprived cellules between the fiber enriched and linking regions, also being characterized by a local basis weight lower than the fiber enriched, wherein the sheet has a Wet Springback Ratio of at least about 0.6.

2. The multi-ply absorbent sheet according to claim 1, wherein the sheet is a two-ply sheet.

3. The multi-ply absorbent sheet according to claim 1, wherein the sheet is a three-ply sheet.

4. The multi-ply absorbent sheet according to claim 1, wherein the non-woven network of the core is an open mesh structure defining a plurality of cellules having regions devoid of fiber.

5. The multi-ply absorbent sheet according to claim 4, wherein the void of the cellules have an average span of from about 10 to about 2500 microns.

6. The multi-ply absorbent sheet according to claim 4, wherein the void of the cellules have an average span of from about 50 to about 500 microns.

7. The multi-ply absorbent sheet according to claim 1, wherein the fiber-deprived cellules have an average span of from about 50 to about 2500 microns.

8. The multi-ply absorbent sheet according to claim 1, wherein the fiber-deprived cellules have an average span of from about 100 to about 500 microns.

9. The multi-ply absorbent sheet according to claim 1, wherein the fiber-deprived cellules comprise a plurality of integument of fiber connecting pileated to adjacent pileated and linking to adjacent linking regions.

10. The multi-ply absorbent sheet according to claim 1, wherein the sheet has a bulk of at least about 6 cc/g.

11. The multi-ply absorbent sheet according to claim 1, wherein the sheet has a bulk of at least about 7.5 cc/g.

12. The multi-ply absorbent sheet according to claim 1, wherein the sheet has a bulk of at least about 10 cc/g.

13. The multi-ply absorbent sheet according to claim 1, wherein the sheet has a bulk of at least about 15 cc/g.

14. The multi-ply absorbent sheet according to claim 1, wherein the sheet has an absorbency of at least 5 g/g.

15. The multi-ply absorbent sheet according to claim 1, wherein the sheet has an absorbency of at least about 7 g/g.

16. The multi-ply absorbent sheet according to claim 1, wherein the sheet has an absorbency of at least about 9 g/g.

17. The multi-ply absorbent sheet according to claim 1, wherein the sheet has an absorbency of at least about 11 g/g.

18. The multi-ply absorbent sheet according to claim 1, wherein the sheet has an absorbency of at least about 13 g/g.

19. The multi-ply absorbent sheet according to claim 1, wherein the sheet has a void volume fraction of from about 0.75 to about 0.85.

20. The multi-ply absorbent sheet according to claim 1, wherein the sheet has a Wet Springback Ratio of at least about 0.65.

21. The multi-ply absorbent sheet according to claim 1, wherein the sheet has a Wet Springback Ratio of from about 0.6 to about 0.8.

22. A three-ply absorbent sheet comprising:

a) a first outer ply of cellulosic sheet having a substantially continuous surface;

b) a second outer ply of cellulosic sheet having a substantially continuous surface; and c) an absorbent core ply sandwiched between the outer plies consisting essentially of a non-woven fiber network of cellulosic fiber comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions, wherein the sheet has a void volume fraction of from about 0.7 to 0.9.

23. A two-ply absorbent sheet of cellulosic fiber comprising:

a) a first ply having a substantially continuous first surface and a second surface with local variations in basis weight comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions;

b) a second ply having a substantially continuous third surface and a fourth surface with local variation in basis weight comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions, wherein the plies are secured to each other such that the second surface of the first ply is in contact with the fourth surface of the second ply to form the core of the sheet and the first surface of the first ply and the third surface of the second ply are outer surfaces of the sheet, and wherein the sheet has a Wet Springback Ratio of at least about 0.6.

24. A multi-ply absorbent sheet of cellulosic fiber provided with outer continuous surfaces and an absorbent core between the outer surfaces, the absorbent core including a non-woven fiber network comprising: (i) a plurality of pileated fiber enriched of relatively high local basis weight interconnected by way of (ii) a plurality of lower local basis weight linking whose fiber orientation is biased along the direction between pileated cells interconnected thereby, and (iii) a plurality of fiber-deprived cellules between the fiber enriched and linking regions, also being characterized by a local basis weight lower than the fiber enriched regions, wherein at least one of the outer surfaces of the sheet is provided with a fused wax composition in intimate contact with the fibers in the web, the fused wax composition including a wax and an emulsifier fused in situ with the sheet and being disposed in the sheet so that the open interstitial microstructure between fibers in the web is substantially preserved and the sheet has a laterally hydrophobic outer surface which exhibits a moisture penetration delay of at least about 2 seconds as well as a contact angle with water of at least 50 degrees at one minute of contact time with the surface.

25. The multi-ply absorbent sheet according to claim 24, wherein the laterally hydrophobic outer surface of the sheet exhibits a moisture penetration delay of from about 3 to about 40 seconds.

26. The multi-ply absorbent sheet according to claim 24, wherein the laterally hydrophobic outer surface of the sheet exhibits a moisture penetration delay of at least about 5 seconds.

27. The multi-ply absorbent sheet according to claim 24, wherein the laterally hydrophobic outer surface of the sheet exhibits a moisture penetration delay of at least about 10 seconds.

* * * * *

UNITED STATES PATENT AND TRADEMARK OFFICE

CERTIFICATE OF CORRECTION

PATENT NO. : 7,662,257 B2
APPLICATION NO. : 11/402609
DATED : February 16, 2010
INVENTOR(S) : Steven L. Edwards et al.

It is certified that error appears in the above-identified patent and that said Letters Patent is hereby corrected as shown below:

Change the Assignee's name on the Title page of the patent at Item (73) from "Georgia-Pacific Consumer Products LLC" to --Georgia-Pacific Consumer Products LP--.

Signed and Sealed this
Twenty-sixth Day of July, 2011

David J. Kappos
*Director of the United States Patent and Trademark Office*